(12) United States Patent
Sun

(10) Patent No.: US 9,157,138 B2
(45) Date of Patent: Oct. 13, 2015

(54) COMPLEX METALLOGRAPHIC STRUCTURED HIGH STRENGTH STEEL AND METHOD OF MANUFACTURING

(71) Applicant: NUCOR CORPORATION, Charlotte, NC (US)

(72) Inventor: Weiping Sun, Canton, MI (US)

(73) Assignee: Nucor Corporation, Charlotte, NC (US)

( * ) Notice: Subject to any disclaimer, the term of this patent is extended or adjusted under 35 U.S.C. 154(b) by 287 days.

(21) Appl. No.: 13/754,721

(22) Filed: Jan. 30, 2013

(65) Prior Publication Data

US 2013/0136950 A1 May 30, 2013

Related U.S. Application Data

(62) Division of application No. 12/246,205, filed on Oct. 6, 2008, now Pat. No. 8,435,363.

(60) Provisional application No. 60/978,997, filed on Oct. 10, 2007.

(51) Int. Cl.
*C22C 38/58* (2006.01)
*C21D 6/00* (2006.01)
(Continued)

(52) U.S. Cl.
CPC .............. *C22C 38/58* (2013.01); *B32B 15/012* (2013.01); *B32B 15/013* (2013.01); *B32B 15/043* (2013.01); *C21D 6/005* (2013.01);
(Continued)

(58) Field of Classification Search
CPC ................................ C22C 38/58; C21D 6/005

USPC .......................................................... 420/44
IPC ......... C22C 38/28; C23C 2/06; C21D 2211/005
See application file for complete search history.

(56) References Cited

U.S. PATENT DOCUMENTS 3,837,894 A    9/1974  Tucker
4,072,543 A    2/1978  Coldren
(Continued)

FOREIGN PATENT DOCUMENTS

AU    2005200300 A1    1/2005
EP    0 881 306 A1    12/1998
(Continued)

OTHER PUBLICATIONS

Acicular Ferrits HSLA Steel for Line Pipe, A. P. Coldren, J. L. Mihetich, Plenum Publishing Corp, Greenwich, Connecticut, pp. 559-572. (Originally published in Metallovendenici Termicheskaya Obrabotka Metallov, No. 7, pp. 44-47. Jul. 1977.).
(Continued)

*Primary Examiner* — Weiping Zhu
(74) *Attorney, Agent, or Firm* — Moore & Van Allen PLLC

(57) ABSTRACT

A multi-phase steel sheet having microstructure having in combination ferrite, martensite of between 3% and 65% by volume, and at least one microstructure selected from the group consisting of, bainite and retained austenite, and having fine complex precipitates selected from the group of TiC, NbC, TiN, NbN, (Ti.Nb)C, (Ti.Nb)N, and (Ti.Nb)(C.N) particles having at least 50% smaller than 20 nm in size, and physical properties having tensile strength greater than about 780 megapascals and at least one of the properties of elongation greater than about 10%, yield ratio greater than about 70%, and hole expansion ratio greater than about 50%.

13 Claims, 9 Drawing Sheets

(51) Int. Cl.

| | | |
|---|---|---|
| *C21D 8/02* | (2006.01) | |
| *C21D 9/46* | (2006.01) | |
| *C22C 38/04* | (2006.01) | |
| *C22C 38/06* | (2006.01) | |
| *C23C 2/06* | (2006.01) | |
| *C23C 2/12* | (2006.01) | |
| *C23C 2/40* | (2006.01) | |
| *B32B 15/01* | (2006.01) | |
| *B32B 15/04* | (2006.01) | |
| *C22C 38/00* | (2006.01) | |
| *C22C 38/02* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/20* | (2006.01) | |
| *C22C 38/24* | (2006.01) | |
| *C22C 38/26* | (2006.01) | |
| *C22C 38/28* | (2006.01) | |
| *C22C 38/38* | (2006.01) | |
| *C22C 38/42* | (2006.01) | |
| *C22C 38/46* | (2006.01) | |
| *C22C 38/48* | (2006.01) | |
| *C22C 38/50* | (2006.01) | |

(52) U.S. Cl.
CPC ........... *C21D 8/0215* (2013.01); *C21D 8/0263* (2013.01); *C21D 9/46* (2013.01); *C22C 38/001* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/20* (2013.01); *C22C 38/24* (2013.01); *C22C 38/26* (2013.01); *C22C 38/28* (2013.01); *C22C 38/38* (2013.01); *C22C 38/42* (2013.01); *C22C 38/46* (2013.01); *C22C 38/48* (2013.01); *C22C 38/50* (2013.01); *C23C 2/06* (2013.01); *C23C 2/12* (2013.01); *C23C 2/40* (2013.01); *C21D 2211/001* (2013.01); *C21D 2211/002* (2013.01); *C21D 2211/004* (2013.01); *C21D 2211/005* (2013.01); *C21D 2211/008* (2013.01); *Y10T 428/12757* (2015.01); *Y10T 428/12799* (2015.01); *Y10T 428/12972* (2015.01)

(56) References Cited

U.S. PATENT DOCUMENTS

| | | |
|---|---|---|
| 4,361,448 A | 11/1982 | Sippola |
| 4,376,661 A | 3/1983 | Takechi |
| 4,394,186 A | 7/1983 | Furukawa |
| 4,398,970 A | 8/1983 | Marder |
| 4,436,561 A | 3/1984 | Takahashi |
| 4,437,902 A | 3/1984 | Pickens |
| 4,609,410 A | 9/1986 | Hu |
| 4,615,749 A | 10/1986 | Satoh |
| 4,708,748 A | 11/1987 | Satoh |
| 4,770,719 A | 9/1988 | Hashiguchi |
| 4,854,976 A | 8/1989 | Era |
| 5,312,493 A | 5/1994 | Masui |
| 5,328,528 A | 7/1994 | Chen |
| 5,454,887 A | 10/1995 | Fukui |
| 5,470,403 A | 11/1995 | Yoshinaga |
| 6,143,100 A | 11/2000 | Sun |
| 6,210,496 B1 | 4/2001 | Takagi |
| 6,221,179 B1 | 4/2001 | Yasuhara |
| 6,264,760 B1 | 7/2001 | Tamehiro |
| 6,312,536 B1 | 11/2001 | Omiya |
| 6,423,426 B1 | 7/2002 | Kobayashi |
| 6,440,584 B1 | 8/2002 | Nagataki |
| 6,537,394 B1 | 3/2003 | Osawa |
| 6,641,931 B2 | 11/2003 | Claessens |
| 6,666,932 B2 | 12/2003 | Funakawa |
| 6,673,171 B2 | 1/2004 | Hlady |
| 6,676,774 B2 | 1/2004 | Matsuoka |
| 6,702,904 B2 | 3/2004 | Kami |
| 6,706,419 B2 | 3/2004 | Yoshinaga |
| 6,709,535 B2 | 3/2004 | Utsumi |
| 6,726,782 B2 | 4/2004 | Nakai |
| 6,811,624 B2 | 11/2004 | Hoydick |
| 6,814,819 B2 | 11/2004 | Matsuoka |
| 6,818,074 B2 | 11/2004 | Matsuoka |
| 6,869,691 B2 | 3/2005 | Nagataki |
| 6,982,012 B2 * | 1/2006 | Nomura et al. ............... 148/540 |
| 7,090,731 B2 | 8/2006 | Kashima |
| 7,118,809 B2 | 10/2006 | Utsumi |
| 7,252,722 B2 | 8/2007 | Nakajima |
| 7,311,789 B2 | 12/2007 | Hoydick |
| 7,381,478 B2 | 6/2008 | Yokoi |
| 7,396,420 B2 | 7/2008 | Matsuoka |
| 7,442,268 B2 | 10/2008 | Sun |
| 7,534,312 B2 | 5/2009 | Yoshinaga |
| 7,553,380 B2 | 6/2009 | Ikeda |
| 7,587,700 B2 | 9/2009 | Nehmadi |
| 7,608,155 B2 | 10/2009 | Sun |
| 2003/0041932 A1 | 3/2003 | Tosaka |
| 2003/0084966 A1 | 5/2003 | Ikeda |
| 2003/0129444 A1 | 7/2003 | Matsuoka |
| 2003/0190493 A1 | 10/2003 | Nomura et al. |
| 2004/0003774 A1 | 1/2004 | Moore |
| 2004/0035500 A1 | 2/2004 | Ikeda |
| 2004/0047756 A1 | 3/2004 | Rege |
| 2004/0074573 A1 | 4/2004 | Funakawa |
| 2004/0108024 A1 | 6/2004 | Matsuoka |
| 2004/0118489 A1 | 6/2004 | Sun |
| 2004/0238080 A1 | 12/2004 | Vandeputte |
| 2004/0238082 A1 | 12/2004 | Hasegawa |
| 2005/0016644 A1 | 1/2005 | Matsuoka |
| 2005/0019601 A1 | 1/2005 | Matsuoka |
| 2006/0144482 A1 | 7/2006 | Moulin |
| 2006/0191612 A1 | 8/2006 | Yoshida |
| 2007/0003774 A1 | 1/2007 | McDaniel |
| 2007/0144633 A1 | 6/2007 | Kizu |
| 2008/0175743 A1 | 7/2008 | Futatsuka |
| 2009/0071574 A1 | 3/2009 | Sun |
| 2009/0071575 A1 | 3/2009 | Sun |
| 2009/0242085 A1 | 10/2009 | Ikeda |
| 2009/0277546 A1 | 11/2009 | Hammer |
| 2010/0043513 A1 | 2/2010 | Hammer |
| 2010/0065151 A1 | 3/2010 | Nelson |
| 2010/0065162 A1 | 3/2010 | Hammer |

FOREIGN PATENT DOCUMENTS

| | | |
|---|---|---|
| EP | 0 945 522 A1 | 9/1999 |
| EP | 0969112 A1 | 1/2000 |
| EP | 1 146 132 A1 | 10/2001 |
| EP | 1 193 322 A1 | 4/2002 |
| EP | 1291448 A1 | 3/2003 |
| EP | 1338667 A1 | 8/2003 |
| EP | 1 431 407 A1 | 6/2004 |
| EP | 1 616 970 A1 | 1/2006 |
| EP | 1 662 014 A1 | 5/2006 |
| EP | 1 666 623 A1 | 6/2006 |
| EP | 1867746 A1 | 12/2007 |
| JP | 54033218 | 3/1979 |
| JP | 54-089241 | 7/1979 |
| JP | 55100934 A | 8/1980 |
| JP | 56013437 A | 2/1981 |
| JP | 58058264 A | 4/1983 |
| JP | 61045788 U | 3/1986 |
| JP | 61045892 | 9/1987 |
| JP | 06-108158 A | 4/1994 |
| JP | 08-246097 A | 9/1996 |
| JP | H0925537 A | 1/1997 |
| JP | 10-251794 A | 9/1998 |
| JP | 11-279682 | 10/1999 |
| JP | 2000239791 A | 9/2000 |
| JP | 2000336455 A | 12/2000 |

(56) References Cited

FOREIGN PATENT DOCUMENTS

| | | |
|---|---|---|
| JP | 2001089811 A | 4/2001 |
| JP | 2001220648 A | 8/2001 |
| JP | 2002-080931 | 3/2002 |
| JP | 2003-342644 | 12/2003 |
| JP | 2004-002909 | 1/2004 |
| JP | 2004225132 A | 8/2004 |
| JP | 2004323951 A | 11/2004 |
| JP | 2004-339606 A | 12/2004 |
| JP | 2007016319 A | 1/2007 |
| KR | 20010063691 A | 7/2001 |
| KR | 20030050213 A | 6/2003 |
| WO | WO2004/057048 A1 | 7/2004 |
| WO | WO 2004059026 A2 | 7/2004 |
| WO | WO2004/094681 A1 | 11/2004 |

OTHER PUBLICATIONS

Dependence of strain hardening exponent on the volume fraction and carbon content of martensite in dual phase steels during multistage work hardening, S.R. Mediratta, V. Ramaswamy, V. Singh, P. Ramarao, Journal of Materials Science Letters 9 (1990), pp. 205-206. 1990 Chapman and Hall Ltd.

Development of Controlled Rolled Ultra Low Carbon Bainitic Steel for Large Diameter Linepipe, H. Nakasugi, H. Matsuda, H. Tamehiro. Supplied by the British Library—The world's knowledge, Alloys for the eighties, Climax Molybdenum Company, [1980?], Greenwich, Conn., pp. 213-224.

Fracture Performance of Progressively Drawn Pearlitic Steel Under Triaxial Stress States. J. Toribio, F. J. Ayaso, Materials Science, vol. 37, No. 5, 2001, pp. 707-717, Plenum Publishing Corporation. (Originally published by Dept. of Materials Engineering. Univ. of Salamanca, Spain in Fizyko-Khimichna Mekhanika Materiallv, vol. 37, pp. 24-30, Sep.-Oct. 2001.).

Hot-Dip Galvanized Sheet Steel with Excellent Press Formability and Surface Quality for the Automotive Panels, K. Abotani, K. Hirohata, T. Kiyasu, Kawasaki Steel Technical Report No. 48 Mar. 2003, pp. 17-22. Originally published in Kawasaki Steel Giho, 34(2002)2, 66-70.).

Recent Developments in Weldability Testing for Advanced Materials, John C. Lippold, 2005 ASM International, Joining of Advanced and Specialty Materials VII, 8 pages, www.asminternational.org.

Resistance Spot Welding of Galvanized Steel: Part II. Mechanisms of Spot Weld Nugget Formation: S. A. Gedeon and T. W. Eagar; Metallurgical Transactions B; vol. 17B, Dec. 1986 pp. 887-901; Manuscript submitted Aug. 15, 1985.

Steel and its heat treatment, Second Edition, Karl-Erik Thelning, Head of Research and Development Smedjebacken-Boxholm Stal AB, Sweden; Butterworths, printed in Great Britain by Mackagys of Chatham Ltd, Kent; pp. 436-437, 1984.

Structural Steels; Effect of Alloying Elements and Structure on the Properties of Low-Carbon Heat-Treatable Steel; V. A. Mayshevskii, T. G. Semicheva, and E. I. Khlusova; Translated from Metallovedenie I Termischeskaya Obrabotka Metallov, No. 9, pp. 5-9, Sep. 2001.

U.S. S Steel—Automotive Center—Comparison of Mechanical Properties; http://www.ussautomotive.com/auto/tech/ mech_properties.htm, copyright 2005.

Weldability of a Corrosion-Resistant Ni—Cr—Mo—Cu Alloy, M. D. Rowe, P. Crook, G. L. Hoback, Welding Journal, pp. 313-S to 320-S. Nov. 2003.

What Happens to Steel During Heat Treatment? Part One: Phase Transformations by Daniel H. Herring, Apr. 9. 2007; http://www.industrialheating.com/CDA/Articles/Column/BNP_GUID_9-5-2006_A_10000000000000083813.

Mexican Patent Office, Mexican Application No. MX/a/2010/003835 Office Action dated Apr. 29, 2013, pp. 1-3.

Canadian Patent Office; Canadian Office Action for Application No. 2,701,903 dated Mar. 19, 2015.

International Preliminary Report of Patentability for International Application No. PCT/US2008/078946 dated Apr. 13, 2010.

* cited by examiner

COMPLEX METALLOGRAPHIC STRUCTURED HIGH STRENGTH STEEL AND METHOD OF MANUFACTURING

RELATED APPLICATION

This application is a divisional of U.S. patent application Ser. No. 12/246,205 filed Oct. 6, 2008, which claims priority to and the benefit of U.S. Provisional Patent Application No. 60/978,997, filed Oct. 10, 2007, the disclosures of which are incorporated herein by reference.

BACKGROUND AND SUMMARY

The present invention relates to a complex metallographic structured or multi-phase steel.

With ever-increasing pressure on the automotive and other industries for energy savings and emission reduction while improving product performance and cost competitiveness, more parts such as automotive parts are being manufactured using high strength steel. Some high strength steels enable use of thinner sheet to reduce the product weight, which improves vehicle fuel efficiency. Further, it is desired to improve vehicle durability, crashworthiness, intrusion resistance and impact performance to protect a driver and passengers upon collision.

Certain industries, including the automotive industry, are utilizing advanced high strength steel, or AHSS, including dual phase steels and transformation induced plasticity, or TRIP, steels. AHSS steels may meet certain strength and weight targets while using existing manufacturing infrastructure. These steels appear promising for applications requiring high press-forming and draw-forming properties to form parts with complex shapes.

However, problems related to the stamping, forming and drawing of dual phase steel and TRIP (transformation induced plasticity) steel are well known, and significant hurdles exist for successful implementation using the existing manufacturing infrastructure. Prior advanced high strength steels exhibited shear fracture, edge fracture, and edge cracking during the stamping or forming of a variety of parts. These fractures may occur when stretching steel over a radius or when stretching an edge of the part. These fractures have occurred on the radii of part geometries at strains well below the expected forming limit of the steel sheet. Further, fractures in prior AHSS occur in the absence of any appreciable thinning or necking normally associated with this type of fracture or cracking in conventional steels. In this way, these fractures have not been predictable using the existing norms of conventional steels, limiting design flexibility and increasing manufacturing uncertainty for prior AHSS.

Moreover, high concentrations of some alloy elements, such as carbon (C), silicon (Si) and aluminum (Al) present in TRIP steels deteriorate the surface quality and weldability of the steel. In particular, difficulty in welding TRIP steels has become a significant challenge for the steel in the automotive industry, and therefore further limits automotive applications of this type of steel.

The above limitations have recently been recognized by some producers and users of the dual phase steel and TRIP steel sheet. Consequently, investigations have been initiated to understand and characterize the fracture mechanisms of high strength dual phase and TRIP steels. There remains a need for a new type of advanced high strength steels to reduce the occurrence of the shear fracture during stamping and forming while improving the structural performance of automotive parts.

U.S. Pat. No. 6,641,931 to Claessens, et al. provides a method of producing a cold rolled metal coated multi-phase steel, characterized by a tensile strength of at least 500 MPa, a yield ratio lower than 0.65 in skinned conditions, and lower than 0.60 in un-skinned conditions. The hot metal coated steel product having a steel composition, by weight, of not more than 1.5% manganese, 0.2 to 0.5% chromium and 0.1 to 0.25% molybdenum, undergoes a thermal treatment in the hot dip metal coating line defined by a soaking temperature between Ac1 and Ac3, a quenching at a primary cooling speed higher than 25° C./s and a secondary cooling speed higher than 4° C./s.

The steels produced using U.S. Pat. No. 6,641,931 method have a low yield ratio, or lower yield strength, which suggests to one skilled in the art that the steel is actually one type of dual phase steel. The method described in this patent requires a strict two steps of cooling rate control, which is difficult to carry out during commercial production in a steel mill, and thus can restrict the commercial application of this method. For instance, the difficultly in precisely controlling the cooling rate during each cooling step makes this method commercially impractical when producing steel sheets with various thickness and/or widths, as requested by different customers.

U.S. Pat. No. 4,854,976 to Era et al. provides a method of producing a multi-phase structured cold rolled high tensile steel sheet. The composition of this steel sheet includes, in weight %, 0.08 to 0.25% carbon, 0.3 to 2.0% silicon, 0.6 to 1.8% manganese, 0.04 to 0.20% phosphorus, not more than 0.10% aluminum, and not more than 0.01% boron. The composition is subjected to hot rolling under the condition that the coiling temperature is less than 600° C. and cold rolling. The cold rolled steel is heated for 1 to 10 minutes at a temperature in the range Ac1+10° C. to Ac3−10° C., then quenched at a cooling rate greater than 50° C./s set up to a temperature 350 to 500° C. with a holding period of 1 to 10 minutes at that temperature before final air cooling. The microstructure of the cold rolled annealed steel has ferrite, bainite and retained austenite, with or without a small amount of martensite, and the percentage of the retained austenite being more than 8%.

As disclosed in the U.S. Pat. No. 4,854,976, carbon is added in a high concentration into the steel sheet in order to obtain high hardenability and strength, which can adversely affect the formability and weldability of the steel. In addition, the above patent also employs phosphorus as a strengthening element. When phosphorus is near the upper limit as described in the '976 patent, the segregation of phosphorus at grain boundaries could occur, which results in brittleness of the steel sheet, and in turn impairs its formability and fatigue property. Moreover, the spring back angle of parts formed from the steel sheet could also be increased. In other words, the shape-fixability of the steel sheet becomes worse. Regarding the manufacturing processes, the castability and rollability of the steel sheet are also deteriorated when too much phosphorus is added. Furthermore, a high phosphorus concentration in steel could adversely affect coating adhesion during the hot dip coating processing.

International Patent Publication No. WO 2004/057048 A1 to Antonissen, et al. is related to a steel composition made by a process comprising a cold rolling step for the production of uncoated, electro-galvanized or hot dip galvanized TRIP steel products. The composition is also characterized by a specific addition of phosphorus. The composition includes, in weight %, 0.13 to 0.26% carbon, 1.0 to 2.2% manganese, 0.8 to 1.5% aluminum, 0.2 to 0.6% silicon, 0.04 to 0.1% phosphorus, not more than 0.012% sulfur, not more than 0.02% nitrogen, not more than 0.10% titanium, not more than 0.10% niobium, not more than 0.10% vanadium, and not more than 0.0010% boron.

As disclosed in the Patent Publication No. WO 2004/057048, the steel produced is a TRIP steel. The high concentrations of carbon and aluminum in this steel would significantly deteriorate its coating adhesion, surface quality and weldability. As stated earlier, the difficulty of welding this type of steel has become a significant challenge for the steel in automotive industry, and limits its automotive applications.

Japan Patent Publication No. 2003/342644 to Yoshida Hiromi et al. discloses a process for manufacturing a multi-phase metallographic structure type hot dip galvanized cold rolled steel sheet. The steel sheet has a composition which consists, by mass, of 0.01 to 0.05% carbon, 0.1 to 1.0% silicon, 1.0 to 3.0% manganese, not more than 0.10% phosphorus, not more than 0.02% sulfur, 0.005 to 0.1% aluminum, not more than 0.02% nitrogen, 0.01 to 0.2% vanadium, and 0.001 to 0.2% niobium, where the respective contents of vanadium (V), niobium (Nb) and carbon (C) satisfy a relation of $0.5 \times C/12 \leq (V/51 + Nb/93) \leq 2 \times C/12$. Titanium is disclosed in an amount between 0.001% and 0.3% and satisfying a relation of $0.5 \times C/12 \leq (V/51 + Nb/93 + Ti/48) \leq 2 \times C/12$.

Japan Patent Publication No. 2004/002909 to Yoshida Hiromi et al. provides a process for manufacturing a multi-phase hot dip galvanized cold rolled steel sheet. In the manufacturing process, after cold-rolling, the steel sheet is subjected to a primary continuous annealing and a secondary continuous annealing. The steel slab has a composition comprising, by mass, 0.01 to 0.05% carbon, 0.1 to 1.0% silicon, 1.0 to 3.0% manganese, not more than 0.10% phosphorus, not more than 0.02% sulfur, 0.005 to 0.1% aluminum, not more than 0.02% nitrogen, 0.01 to 0.2% vanadium, 0.005 to 0.2% niobium, provided that the contents of vanadium (V), niobium (Nb) and carbon (C) satisfy a relation: $0.5 \times C/12 \leq (V/51 + Nb/93) \leq 2 \times C/12$. Titanium is disclosed in an amount between 0.001% and 0.3% and satisfying a relation of $0.5 \times C/12 \leq (V/51 + Nb/93 + Ti/48) \leq 2 \times C/12$.

Vanadium is used in the compositions of these two Japanese patent publications in high concentrations. When the concentration of this element is close to or above the middle range of the limit as described in these patents, the vanadium carbides or vanadium nitrides are respectively precipitated out in the steel sheet. Since these types of precipitates are usually formed on grain boundaries, they can not only markedly reduce castability during manufacturing the steel sheet, but also can deteriorate the formability of the steel sheet when forming or press forming the produced steel sheet into the final automotive parts. Moreover, the impact toughness, fracture performance, crashworthiness, stretch formability and stretch flangeability of the steel sheet could also be reduced due to the occurrence of these precipitates.

A hot dip coated, high strength, complex metallographic structured or multi-phase structured steel is presently disclosed that improves fracture performance during stamping and forming, while possessing one or more of the following properties: excellent formability, excellent fracture performance, excellent stretch formability, excellent stretch flangeability, excellent dent resistance, excellent durability, excellent impact performance, excellent intrusion and crash resistance and excellent weldability.

A complex metallographic structured steel sheet is disclosed comprising:
(a) a composition comprising the following elements by weight:
carbon in a range from about 0.02% to about 0.2%,
manganese in a range from about 0.2% to about 3.5%,
phosphorous less than or equal to about 0.1%,
sulfur less than or equal to about 0.03%,
silicon less than or equal to about 1.2%,
aluminum in a range from about 0.01% to about 0.10%,
nitrogen less than or equal to about 0.02%,
copper less than or equal to about 0.8%,
vanadium less than or equal to about 0.12%,
one chosen from molybdenum, chromium, nickel, and a combination thereof, in a range between about 0.05% and about 3.5%, and
one chosen from titanium, niobium and a combination thereof, in a range between about 0.005% and about 0.8%, wherein, if present, titanium (Ti) is present with nitrogen (N) and sulfur (S) satisfying a relationship Ti* greater than or equal to about 0.01% and less than or equal to about 0.6%, where Ti* equals $(Ti-(24/7)N-(3/2)S)$,
and the balance of the composition comprising iron and incidental ingredients;
(b) a multi-phase microstructure having in combination ferrite, martensite between 3% and 65% by volume, and at least one microstructure selected from the group consisting of bainite and retained austenite, and having fine complex precipitates selected from the group of TiC, NbC, TiN, NbN, (Ti.Nb)C, (Ti.Nb)N, and (Ti.Nb)(C.N) particles having at least 50% smaller than 20 nm in size, and
(c) physical properties comprising tensile strength greater than about 780 megapascals and at least one of the following properties of elongation greater than about 10%, yield ratio greater than about 70%, and hole expansion ratio greater than about 50%.

Alternately, the martensite phase of the microstructure may be between 10% and 35% by volume. The bainite phase of the microstructure may be between about 2% and about 20% by volume of the microstructure, or alternately may be between about 5% and about 15% by volume. The retained austenite phase of the microstructure may be between about 1% and about 12% by volume of the microstructure, or alternately may be between about 3% and about 8% by volume. The ferrite in the microstructure may be between 20 and 85% by volume of the microstructure. Further, the complex metallographic structured steel may have a hot-dipped coating chosen from zinc, aluminum, or an alloy thereof.

The composition may contain a purposeful addition of calcium less than or equal to about 0.02%.

The complex metallographic structured steel may have a yield strength at least about 650 megapascals, and may have an impact strength greater than about 1200 gram-meters measured on a Charpy V-notch specimen 1.5 millimeters thick. The complex metallographic structured steel may have weldability characteristic defined by a weld current range greater than 2 kiloamperes measured for a weld time greater than 15 cycles in a 1.5 millimeter thick sheet that is galvanized and not galvannealed.

Presently disclosed is a practical manufacturing method of reliably making the complex metallographic structured or multi-phase structured steel, which may be carried out by steel manufacturers with little or no increase in manufacturing cost.

A method of making a complex metallographic structured steel sheet may comprise
a) assembling a continuous metal slab caster having a casting mold, b) introducing molten steel into the casting mold and continuously casting a molten steel into a slab having a composition comprising the following elements by weight:
  carbon in a range from about 0.02% to about 0.2%,
  manganese in a range from about 0.2% to about 3.5%,
  phosphorous less than or equal to about 0.1%,
  sulfur less than or equal to about 0.03%,
  silicon less than or equal to about 1.2%,
  aluminum in a range from about 0.01% to about 0.10%,
  nitrogen less than or equal to about 0.02%,
  copper less than or equal to about 0.8%,
  vanadium less than or equal to about 0.12%,
  one chosen from molybdenum, chromium, nickel, and a combination thereof, in a range between about 0.05% and about 3.5%, and
  one chosen from titanium, niobium, and a combination thereof, in a range between about 0.005% and about 0.8%, wherein, if present, titanium (Ti) is present with nitrogen (N) and sulfur (S) satisfying a relationship Ti* is greater than or equal to about 0.01% and less than or equal to about 0.6%, where Ti* equals (Ti−(24/7)N−(3/2)S),
  and the balance of the composition comprising iron and incidental ingredients;
c) hot rolling the steel slab having an exit temperature in a range between about $(A_{r3}-60)°$ C. and about 1000° C. (about 1832° F.);
d) cooling the hot rolled steel at a mean cooling rate of at least about 3° C./s (about 5.4° F./s);
e) optionally, coiling the steel at a temperature between about 400° C. (about 752° F.) and about 800° C. (about 1472° F.);
f) cold rolling the steel to a desired steel sheet thickness, with the cold rolling reduction being at least about 25%;
g) heating the steel sheet to a temperature in the range between about 625° C. (about 1157° F.) and about 925° C. (about 1697° F.) for between about 10 seconds and 10 minutes; and
h) cooling the steel sheet to a temperature in the range between about 400° C. (about 752° F.) and about 550° C. (about 1022° F.) at a cooling rate of at least 3° C./s to obtain a multi-phase microstructure having in combination ferrite, martensite between 3% and 65% by volume, at least one microstructure selected from the group consisting of bainite and retained austenite, and having fine complex precipitates selected from the group of TiC, NbC, TiN, NbN, (Ti.Nb)C, (Ti.Nb)N, and (Ti.Nb)(C.N) particles having at least 50% smaller than 20 nm in size, and physical properties comprising tensile strength greater than about 780 megapascals and at least one of the properties of elongation greater than about 10%, yield ratio greater than about 70%, and hole expansion ratio greater than about 50%.

Optionally, the cold rolling reduction may be at least about 35%. Further, the method of making a complex metallographic structured steel may include the steps of dipping the steel sheet through a bath of coating material to coat the surface of the steel sheet with the coating; and further cooling the sheet to a desired temperature. The hot dip coating may be annealed at a temperature in a range between about 450° C. (842° F.) to 650° C. (1202° F.). The cooling in step (h) may be between about 3° C./s and 25° C./s.

Again, the composition may contain a purposeful addition of calcium less than or equal to about 0.02%.

The invention is now discussed in connection with the accompanying Figures and the Examples described below.

DETAILED DESCRIPTION OF THE DISCLOSURE

Figure 1:
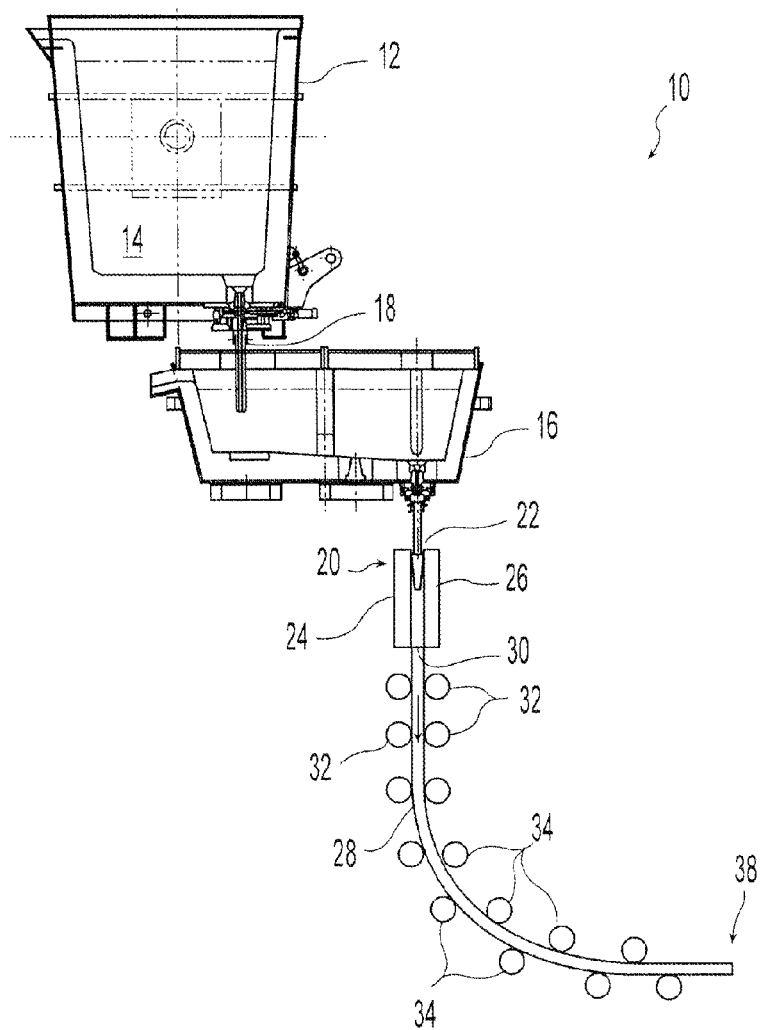
FIG. 1 is a diagrammatical side view of a caster that may be used for producing the steel of the present disclosure.

FIG. 1 is a diagrammatical illustration of a continuous metal slab caster 10. The steel slab caster 10 includes a ladle 12 to provide molten steel 14 to a tundish 16 through a shroud 18. The tundish 16 directs the molten melt 14 to the casting mold 20 through a submerged entry nozzle (SEN) 22 connected to a bottom of the tundish 16. The casting mold 20 includes at least two opposing mold faces 24 and 26, which may be fixed or moveable. The SEN 22 delivers the molten melt into the casting mold 20 below the surface ("meniscus") of the molten metal in the casting mold 20.

The width of cast strand 28 leaving the casting mold 20 is determined by the configuration of the caster mold faces at the mold exit at 30. The two opposing mold faces 24 and 26 are broad mold faces, and the casting mold 20 has two opposing narrow mold faces (not shown) to form a substantially rectangular configuration, or some other desired configuration for the cast strand 28. At least one pair of the mold faces of the casting mold 20 typically is oscillating to facilitate downward movement of the molten metal through the casting mold 20. The cast strand 28 enters sets of pinch rolls 32. The sets of pinch rolls 32 serve to feed the cast strand 28 downward and toward a withdrawal straightener 34.

The cast strand 28 enters the withdrawal straightener 34 which serves to transition direction of travel of the strand 28 to a substantially horizontal direction. The withdrawal straightener 34 provides support for the cast strand 28 as the strand cools and progresses at casting speed through the withdrawal straightener 34 toward at least one hot rolling mill 36. The withdrawal straightener 34 includes drives for its rolls (not shown) to move the cast strand 28 through the withdrawal straightener as casting proceeds.

Figure 2A:
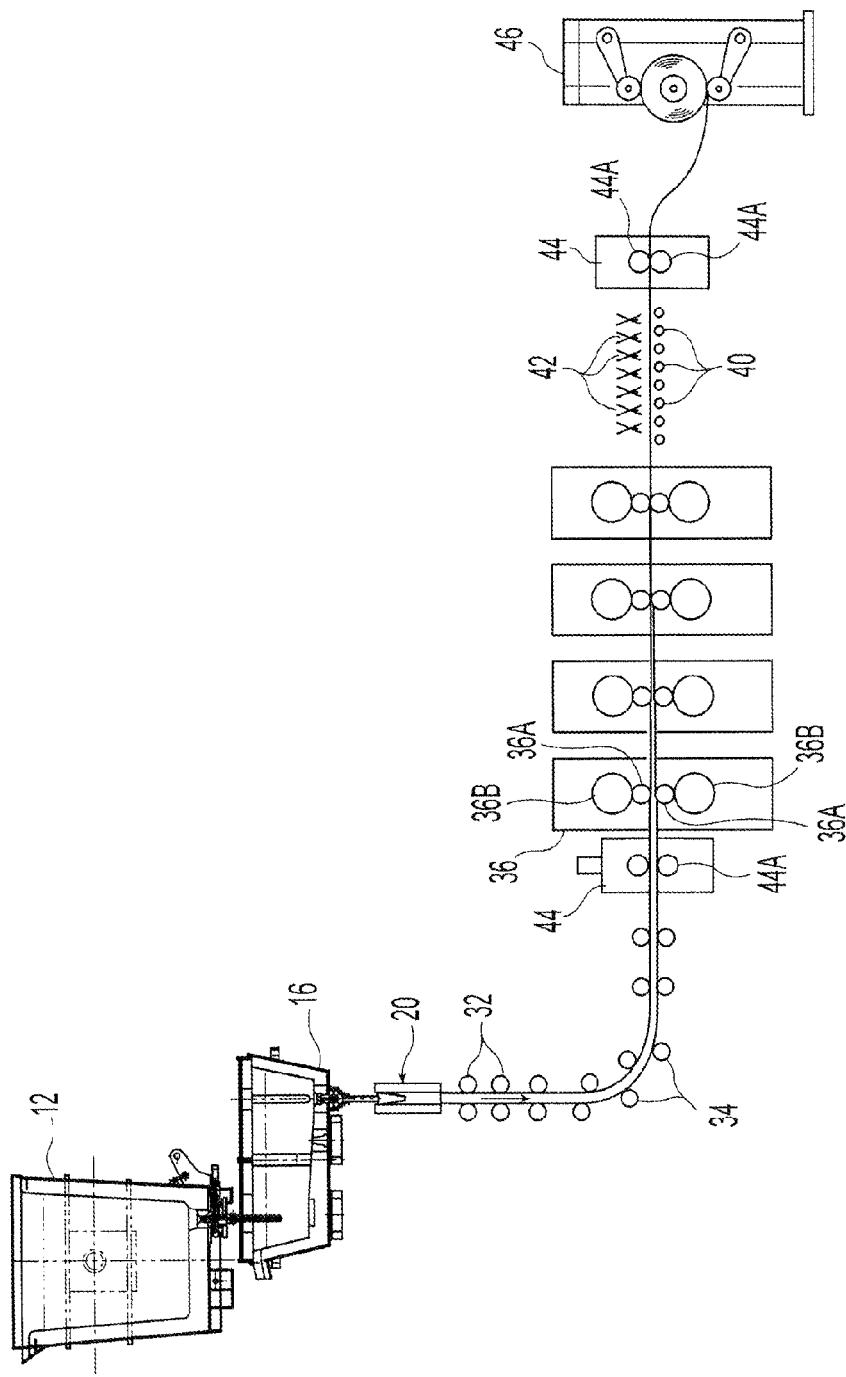
FIG. 2A is a diagrammatical side view of a casting process including hot rolling mills.

As shown in FIG. 2A, the cast strand 28 passes through at least one hot rolling mill 36, comprising a pair of reduction rolls 36A and backing rolls 36B, where the cast strip is hot rolled to reduce to a desired thickness. The rolled strip passes onto a run-out table 40 where it is cooled by contact with water supplied via water jets 42 or by other suitable means, and by convection and radiation. In any event, the rolled strip may then pass through a pinch roll stand 44 comprising a pair of pinch rolls 44A and then may be directed to a coiler 46.

Alternately, the strand 28 may be directed to a cutting tool 38, such as but not limited to a shear, after the cast metal strand exits the withdrawal straightener 34 and is sufficiently solidified to be cut laterally (i.e., transverse to the direction of travel of the cast strand). As the strand 28 is cut into slabs, blooms, or billets, for example, the intermediate product may be transported away on rollers or other supports to be hot rolled.

During casting, water (or some other coolant) is circulated through the casting mold 20 to cool and solidify the surfaces of the cast strand 28 at the mold faces. The rollers of the withdrawal straightener 34 may also be sprayed with water, if desired, to further cool the cast strand 28.

Figure 2B:
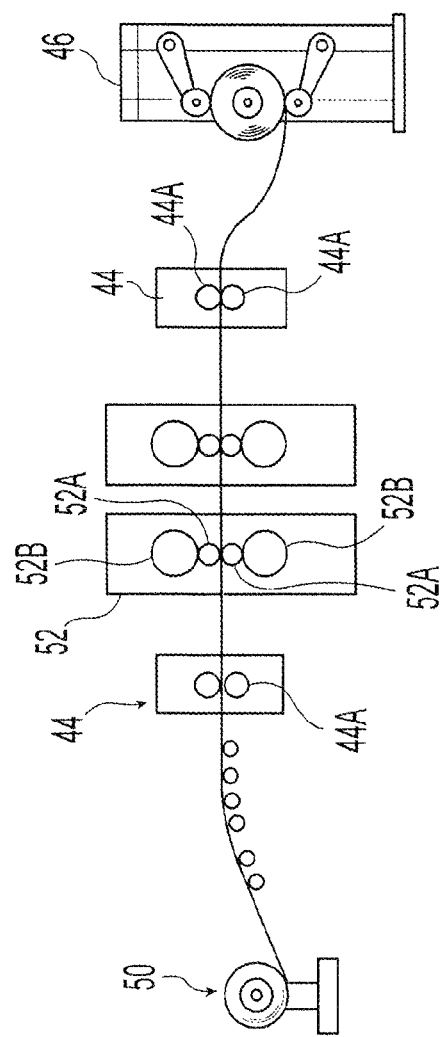
FIG. 2B is a diagrammatical side view of a cold rolling process.

The hot rolled steel is then cold rolled, and may then processed through a continuous annealing and hot dip coating system or galvanizing line. As shown in FIG. 2B, the sheet may be cold rolled by passing the sheet through at least one cold rolling mill 52. The cold rolling mill typically has a pair of reduction rolls 52A and backing rolls 52B, where the steel thickness is reduced to a desired thickness.

Figure 3A:
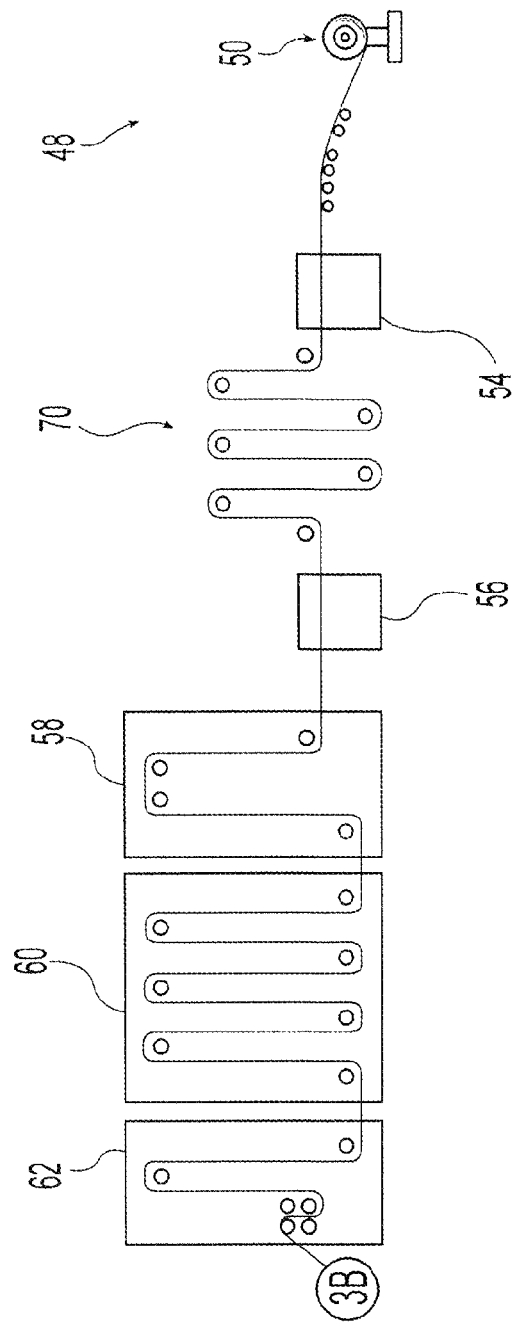
FIG. 3A is a diagrammatical side view of a portion of a continuous annealing and hot dip coating line showing the continuous annealing portion.
Figure 3B:
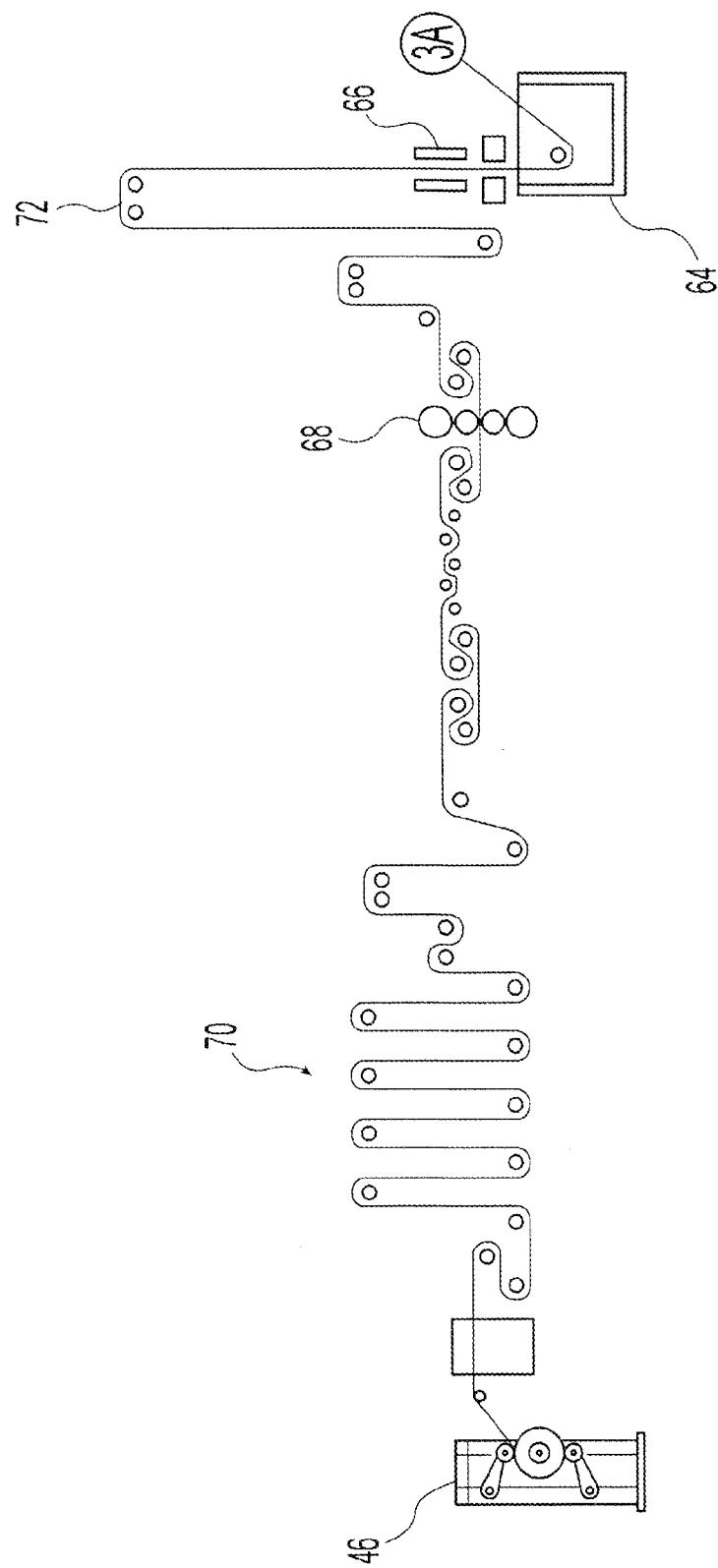
FIG. 3B is a diagrammatical side view of a portion of a continuous annealing and hot dip coating line showing the hot dip coating portion.

In one example of a continuous annealing and hot dip coating system shown in FIGS. 3A and 3B, the continuous annealing and hot dip coating system includes a sheet feeding facility 48, in which the hot rolled steel is placed on an uncoiler 50. The steel may then pass through a welder (not shown) capable of joining the tailing end of one sheet with the leading end of another sheet.

The sheet may pass through a cleaning station 54 with a rinse bath 56. The continuous annealing and hot dip coating system further includes a heating zone 58, a soaking or annealing zone 60, and a cooling zone 62. When the steel sheet reaches a temperature for coating, the sheet may pass through a hot dip or galvanizing bath 64. A coating annealing furnace, or galvannealing furnace 66 may be provided. The continuous annealing and hot dip coating system may include a temper mill 68, and may provide at least one sheet accumulator 70 to accommodate variations in feeding the sheet through the continuous annealing and hot dip coating system. Cooling systems and other chemical treatments may be provided. As shown in FIG. 3, the steel may be air cooled by traveling through an air cooling tower 72 or other cooling system.

The steel of the present disclosure has high yield strength, high tensile strength, and has a complex metallographic structure, or multi-phase structure. The multi-phase microstructure may have in combination martensite, ferrite, and at least one microstructure chosen from bainite, retained austenite, and fine complex precipitates. The martensite phase is between 3% and 65% by volume of the microstructure. The steel sheet may be hot dip coated with a coating such as but not limited to zinc, aluminum, an alloy of zinc and aluminum, or other coating. The coating on the steel may be annealed after the hot dip coating has been applied, such as but not limited to a process known as galvannealing. The complex phase steel sheet can be formed and used in applications including, but not limited to, automobiles, ships, airplanes, trains, electrical appliances, building components and other machineries.

The complex phase steel of the present disclosure has one or more of a property chosen from excellent formability, excellent fracture performance, excellent stretch formability, excellent stretch flangeability, excellent dent resistance, excellent durability, excellent intrusion resistance, excellent crashworthiness, excellent impact performance, and excellent weldability and, in a preferred embodiment, has excellent surface and shape quality.

By excellent formability, it is meant that a total elongation higher than about 10%, and may be higher than about 12% measured based on ASTM A370 for Standard Test Methods and Definitions for Mechanical Testing of Steel Products, while the tensile strength of the steel is greater than about 780 megapascals, and may be greater than about 800 megapascals, measured based on ASTM A370 for Standard Test Methods and Definitions for Mechanical Testing of Steel Products. Higher total elongation values may be reported when employing other tensile testing standards, such as JIS and DIN standards.

By excellent fracture performance, excellent stretch formability and excellent stretch flangeability, it is meant that a hole expansion ratio is greater than about 50%, and may be greater than about 60%. A hole expansion ratio greater than 50% may enable the stamping and forming of various complex parts with neither apparent shear fractures nor edge fractures observed when the steel sheet is formed during stamping or forming processes that include stretching a part over a radius and stretching an edge of the part. The hole expansion ratio is determined by Japan Iron and Steel Federation Standard JFS T1001. The hole expansion ratio is defined as the amount of expansion obtained in a circular punch hole of a test piece when a conical punch is pressed into the hole until any of the cracks that form at the hole edge extend through the test piece thickness. Numerically, the hole expansion ratio is expressed as the ratio of the final hole diameter at fracture through thickness to the original hole diameter, as defined by the following equation:

$$\lambda=((D_h-D_o)/D_o)\times 100$$

where $\lambda$=Hole expansion ratio (%), $D_o$=Original hole diameter ($D_o$=10 mm), and $D_h$=Hole Diameter after fracture (mm).

By excellent dent resistance, excellent durability, excellent intrusion resistance, and excellent crashworthiness, it is meant yield strength greater than 600 megapascals, and may be greater than 680 megapascals, and a yield/tensile ratio, or the yield ratio, being higher than about 70%, and may be greater than about 80%.

By excellent impact performance, it is meant an impact energy higher than about 1200 gram-meters, and may be higher than about 1300 gram-meters, the impact energy being measured on a V-notch Charpy specimen of about 1.5 millimeter thickness.

By excellent weldability, it is meant that weldability is superior to the weldability of known advanced high strength steel with similar tensile strength. With respect to the weld lobe chart generated for resistance spot welding, a weld current range may be wider than 2000 amperes, and may be wider than 2200 amperes on the steel having tensile strength higher than 800 megapascals. Further, with respect to peel tests after resistance spot welding, when peel tests are performed on weld nuggets of like pieces of steel sheet, the nuggets are observed to have de minimus or no shrinkage, voids, or micro cracks, using a wide range of welding conditions. Neither interfacial separation nor a change of nugget size at longer hold time is revealed on the welded samples. With respect to the chisel tests after resistance spot welding, none of the chisel samples were separated and the base steel was deformed around the sample welds in the multi-phase steel sheets.

A very good surface and shape appearance is qualitatively observed when the sheet is pickled, and then galvanized, and optionally galvanized and galvannealed, then tension leveled or skin passed using a total elongation or extension of not more than 1%.

The present complex phase steel may be manufactured by a method having the following steps:

i. Assembling a continuous metal slab caster having a casting mold, such as but not limited to a compact strip production facility.

ii. Introducing molten steel into the casting mold and continuously casting the molten steel into a slab, with a thickness that may be between about 25 and about 100 mm, and a composition having the following elements by weight:

about 0.02% to about 0.2% carbon (C),
about 0.2% to about 3.5% manganese (Mn),
less than about 0.1% phosphorous (P),
less than about 0.03% sulfur (S),
less than about 1.2% silicon (Si),
about 0.01% to about 0.1% aluminum (Al),
less than about 0.02% nitrogen (N),
less than about 0.8% copper (Cu),
less than about 0.12% vanadium (V),
molybdenum (Mo) or chromium (Cr) or nickel (Ni) or a combination thereof in a range from about 0.05% to about 3.5%, and
titanium (Ti) or niobium (Nb) or a combination thereof in a range from about 0.005% to about 0.8%, where if present, titanium (Ti) is present with nitrogen (N) and sulfur (S) satisfying a relationship Ti* greater than or equal to about 0.01% and less than or equal to about 0.6%, and with the balance of the composition comprising substantially iron (Fe) and inevitable impurities. Ti* is known as the effective titanium content, and equals (Ti−(24/7)N−(3/2)S).

The composition may have a purposeful addition of less than about 0.02% calcium (Ca)

iii. Hot rolling the steel slab to form a hot rolled band, or a hot rolled sheet, and completing the hot rolling process at a finishing exit temperature, or hot rolling termination temperature, in a range between about $(A_{r3}-60)°$ C. and about 1000° C. (about 1832° F.).

iv. After hot rolling, cooling the hot rolled steel at a mean cooling rate of at least about 3° C./s (about 5.4° F./s).

v. Coiling the cooled steel sheet at a temperature between about 400° C. (about 752° F.) and about 800° C. (about 1472° F.).

vi. Optionally, pickling the coil to improve the surface quality.

vii. Cold rolling the coil to a desired steel sheet thickness, with the total draft or reduction being at least about 25%.

viii. Plating by hot dip coating (also known as the galvanizing process) in order to apply a coating of zinc, aluminum, or an alloy of zinc and aluminum onto the surface of the sheet to improve the corrosion resistance. A method of hot dip coating may include the steps of:

heating the steel sheet to a temperature in the range between about 625° C. (about 1157° F.) and about 925° C. (about 1697° F.), and may include holding that temperature in a soaking zone of the processing line for a desired duration;

cooling the steel sheet to a temperature in the range between about 400° C. (about 752° F.) and about 550° C. (about 1022° F.), which may be close to the temperature in a bath of coating material;

dipping the steel sheet through the bath of coating material to coat the surface of the steel sheet with the coating; and further cooling the sheet to a desired temperature. No particular cooling rate is required after the hot dipping process.

ix. Optionally, annealing the coating on the steel sheet after the hot dipping process (also known as a galvannealing treatment) by reheating the steel sheet to a temperature in a range between about 450° C. (842° F.) to 650° C. (1202° F.) for a desired duration, such as for example but not limited to between about 1 and 30 seconds, or alternately, the annealing duration may be greater than 30 seconds.

x. After hot dip coating and, optionally, annealing, one or more of the processes of tension leveling, skin passing, and temper rolling may be employed to improve the surface shape of the coated steel sheet.

Alternately, after cold rolling the steel sheet may be directed to a continuous annealing line omitting the step of dipping the steel sheet through the bath of coating material.

Alternately, a steel slab thicker than 100 millimeters with the above chemical composition may be produced by continuous casting. For a thick slab, such as thicker than 100 millimeters, a reheating step may be desired prior to the hot rolling operation. In a reheating step, the steel slab is reheated to a temperature in the range between about 1000° C. (1832° F.) and about 1350° C. (2462° F.), followed by holding at this temperature for a period of not less than about 10 minutes.

The presently disclosed hot dip coated, high strength steel possesses a complex metallographic structure or multi-phase structure containing ferrite, martensite between about 3% and about 65% by volume of the microstructure, and at least one microstructure selected from the group consisting of bainite, which may be between about 2% and about 20% by volume of the microstructure, and retained austenite, which may be between about 1% and about 12% by volume of the microstructure, and having fine complex precipitates selected from the group of TiC, NbC, TiN, NbN, (Ti.Nb)C, (Ti.Nb)N, and (Ti.Nb)(C.N) particles having at least 50% smaller than 20 nm in size. The ferrite in the microstructure is between about 20 and 85% by volume of the microstructure.

Alternately, the martensite phase of the microstructure may be between about 10% and 35% by volume of the microstructure. Alternately, the ferrite in the microstructure may be between about 40% and 70% by volume of the microstructure. Alternately, the bainite phase of the microstructure may be between about 5% and 15% by volume of the microstructure. The retained austenite phase of the microstructure is less than about 12% by volume of the microstructure. In an embodiment of the multi-phase steel, the retained austenite phase of the microstructure is at least about 5% by volume of the microstructure. Alternately, the retained austenite phase of the microstructure is between about 3% and 8% by volume of the microstructure.

In the foregoing process, steps i. through x., the complex metallographic structure may be formed by continuous annealing after cold rolling on a continuous annealing, and alternatively or in addition, a hot dip coating system or galvanizing line. The steel sheet may be formed or press formed to manufacture the desired end shapes for any final applications.

Figure 4:
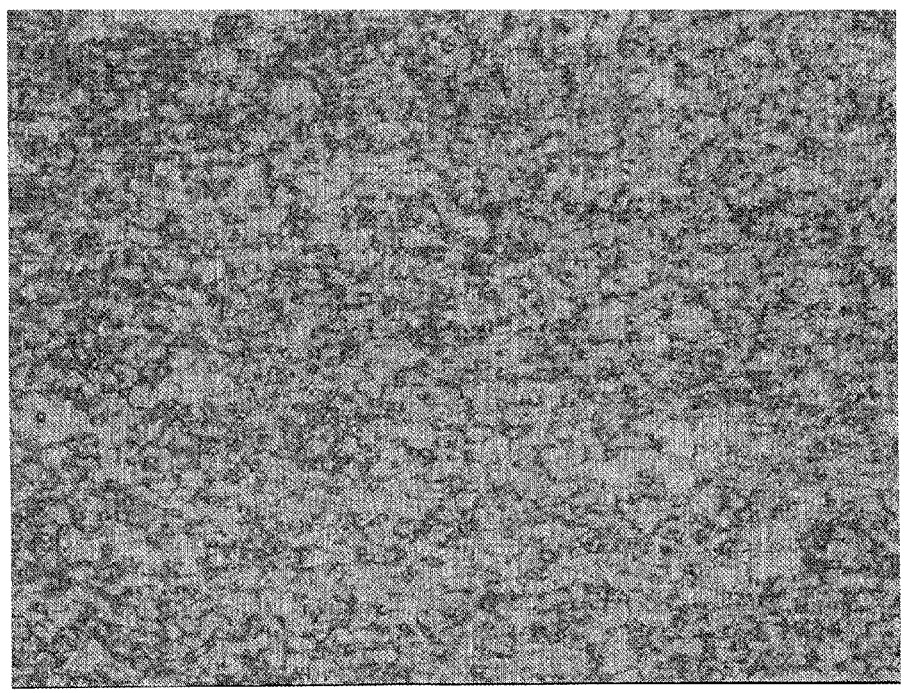
FIG. 4 is a micrograph showing complex metallographic structure with a martensite phase, ferrite phase, bainite phase and some retained austenite in the steel as claimed in the present disclosure.

FIG. 4 exhibits a micrograph of the present multi-phase structure steel. The micrograph of FIG. 4 was obtained using a Nikon Epiphot 200 Microscope, at 1000× magnification. As illustrated by this micrograph, fine hard martensite islands/particles are uniformly distributed in the matrix. The micrograph also shows the presence of ferrite phase, bainite or bainitic ferrite phase and retained austenite islands in the steel.

In order to observe the very fine complex precipitates in the present multi-phase steel, thin foil specimens were prepared from steel sheet using the following procedures:

i. Obtain a steel sheet with a thickness of about 1.5 mm, and an area of about 10 mm×10 mm, using a low speed cutting wheel. Each sheet was subsequently thinned mechanically to a thickness of 0.2 to 0.25 mm.

ii. In order to remove any dislocation which could have been induced during mechanical thinning, the 0.2 to 0.25 mm sheets were further thinned by chemical polishing. The final thickness of each sheet after chemical polishing was 0.06 to 0.08 mm.

iii. Discs having a diameter of 3 mm were punched from the center-most region of the 0.06 to 0.08 mm thick sheets. These discs were further thinned by electrolytic twin-jet polishing at room temperature. The electrolyte consisted of about 90% acetic acid and about 10% perchloric acid. Polishing took place at 40 to 80 volts DC and a current of 25 to 50 microamperes. The polish was automatically stopped when an optical sensor detected a hole in the center of the foil.

iv. Immediately after disc perforation, the holder and sample were removed from the polisher and immersed in ethanol to remove any electrolyte residue.

The foils prepared using the above procedures are analyzed using a JEM-200CX transmission electron microscope (TEM) and JEM 2000FX scanning transmission electron microscope (STEM) both operated at 200 kilovolts.

Figure 5:
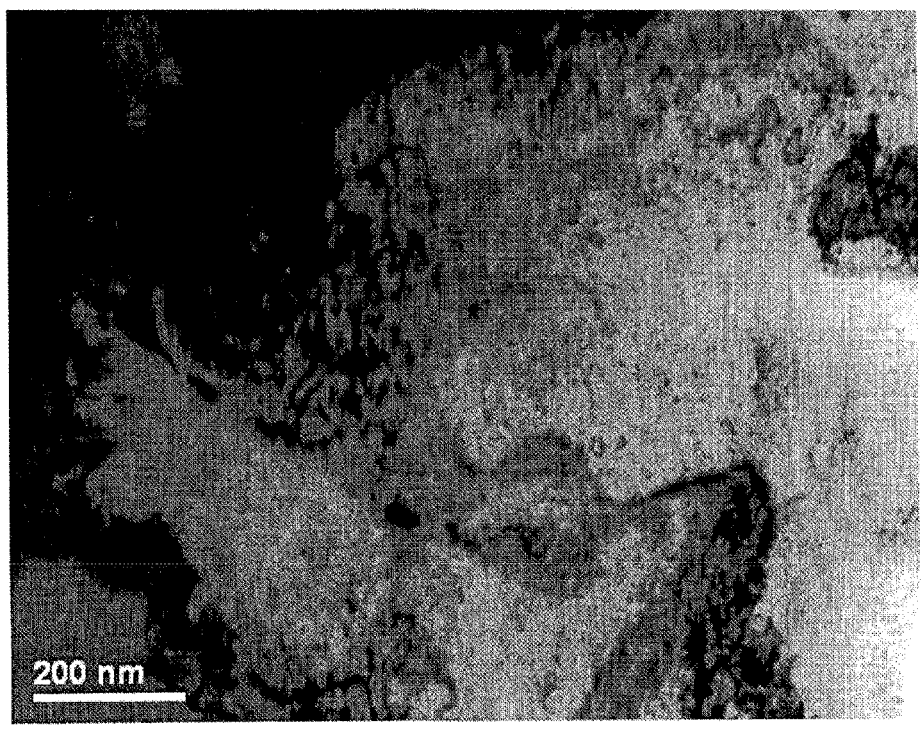
FIG. 5 is a micrograph showing very fine complex precipitates formed in an embodiment of the presently disclosed complex metallographic structure steel.

FIG. 5 depicts a typical micrograph obtained on one of these thin foil specimens. This micrograph demonstrates the very fine (smaller than 50 nanometers) complex precipitates formed in the presently invented hot dip coated, high strength, complex metallographic structured or multi-phase structured steel.

The complex metallographic structure or multi-phase structure including martensite, ferrite, bainite, retained austenite, and fine complex precipitates may provide the above described desired properties. Further, steel sheet produced according to the present disclosure may be manufactured using existing, commercial manufacturing facilities. The composition of the complex phase steel of the present disclosure includes elements as described below.

The multi-phase steel composition includes carbon in an amount of at least about 0.01% by weight. Additional carbon may be used to increase the formation of martensite, such as at least 0.02% by weight. However, a large amount of carbon in the steel may degrade the formability and weldability, so the upper limit of carbon in the present complex phase steel is about 0.2%, and may be about 0.18%.

Manganese is present at least about 0.2% by weight in order to ensure the strength and hardenability of the multi-phase steel. Additional manganese may be added to enhance the stability of forming the martensite phase in the steel, such as at least about 0.5% by weight. However, when the amount exceeds about 3.5% by weight the weldability of the steel may be adversely affected, so the manganese content is less than about 3.5% by weight, and may be less than about 3% by weight.

Although no phosphorus may be present, a small amount of phosphorus may be added because in principle, phosphorus exerts a similar affect to manganese and silicon in view of solid solution hardening. However, when a large amount of phosphorus is added to the steel, the castability and rollability of the steel are deteriorated. Excess phosphorus segregates at grain boundaries and causes brittleness of the steel. Moreover, the excessive addition of phosphorus degrades the surface quality of the hot dip coated steel. For these reasons, the amount of phosphorus is less than about 0.1% by weight. Alternately, the amount of phosphorus is less than about 0.08% by weight, and may be less than about 0.06% by weight.

Sulfur is not usually added to the steel because sulfur may cause deterioration of ductility, formability and toughness. However, sulfur may be present as a residual element, the amount of which depends on the steel making techniques employed. Since the presently disclosed multi-phase steel contains manganese, sulfur my be precipitated in the form of manganese sulfides. The multi-phase steel composition includes an amount of sulfur less than about 0.03%. Alternately, the amount of sulfur may be less than about 0.02% by weight, and may be less than about 0.01% by weight.

Calcium helps to modify the shape of sulfides. As a result, calcium reduces the harmful effect due to the presence of sulfur and eventually improves the toughness, stretch flangeability, and fatigue properties of the steel. However, in the present complex metallographic structured steel sheet, this beneficial effect does not increase when the amount of calcium exceeds about 0.02% by weight. The upper limit of calcium is about 0.02% by weight. Alternately, the amount of calcium is less than about 0.01% by weight.

Silicon may be added as a strengthening element, for improving the strength of the steel with little decrease in the ductility or formability. In addition, silicon promotes the ferrite transformation and delays the pearlite transformation, which is useful for stably attaining a complex metallographic structure or multi-phase structure in the steel. However, excessive addition of silicon can degrade the adhesion of a zinc coating or a zinc alloy coating. The silicon content in the multi-phase steel is less than about 1.2% by weight. Alternately, the silicon content is less than about 1% by weight.

Aluminum is employed for deoxidization of the steel and is effective in fixing nitrogen to form aluminum nitrides. The lower limit of aluminum as a deoxidization element is about 0.01% by weight, and may be about 0.015% by weight. However, to preserve the ductility and formability of the steel, aluminum is less than about 0.1% by weight. Alternately, the amount of aluminum is less than about 0.09% by weight, and may be less than about 0.08% by weight.

Although no boron may be present, the addition of a small amount of boron as an alloying element may improve the hardenability and strength of the steel. However, when boron is added in excess, the rollability of the steel typically is lowered. The upper limit of boron content is about 0.01% by weight, and may be about 0.008% by weight.

The addition of a small amount of nitrogen may be beneficial. However, the upper limit of nitrogen content is about 0.02%. Alternately, the amount of nitrogen is less than about 0.015%, and may be less than about 0.012% by weight.

Although no copper may be present, the addition of a small amount of copper as an alloying element may improve the hardenability and strength of the steel. However, excess addition of this element could lower the surface quality and weldability of the steel. In addition, this element is expensive. Accordingly, the upper limit for this element is about 0.8% by weight. Alternately, the amount of copper is less than about 0.7% by weight, and may be less than about 0.6% by weight.

Molybdenum, chromium and nickel are effective for increasing the hardenability and strength of the steel. These elements are also useful for stabilizing the retaining austenite and promoting the formation of martensite while having little effect on austenite to ferrite transformation. These elements can also improve the impact toughness of steel because these elements contribute to the suppression of formation and growth of micro-cracks and voids. Furthermore, these elements are effective for preventing softening at HAZ (heat affected zone) during welding, and thus help to improve the weldability of the steel. In the present multi-phase steel, the sum of these three elements, Mo+Cr+Ni, is at least about 0.05%. Alternately, the sum of Mo+Cr+Ni is at least about 0.08%. In order to maintain a reasonable manufacturing cost and maintain surface quality of hot dip galvanized steel sheet, on the other hand, the sum of Mo+Cr+Ni may be limited to less than or equal to about 3.5% by weight. Alternately, the upper limit of the sum of Mo+Cr+Ni, may be less than about 3%.

The addition of niobium and titanium is beneficial as these alloying elements can form very fine precipitates, which have a strong effect for retarding austenite recrystallization and refining ferrite grains. These fine precipitates further increase the strength of the steel through "precipitation strengthening" mechanisms. These elements are also useful to accelerate the transformation of austenite to ferrite. One of niobium and titanium may be used alone, or they may be employed in combination. The sum of Ti+Nb is at least about 0.005% by weight, and may be at least 0.008%. However, when the total content of these elements exceeds about 0.8% by weight, excess precipitates are formed in the steel, increasing precipitation hardening and reducing castability and rollability during manufacturing the steel and forming parts. The total content of niobium, titanium, or a combination thereof is limited to not more than about 0.8%. Alternately, the total content of niobium, titanium, or a combination thereof is limited to not more than about 0.6% by weight. In sum, titanium (Ti) or niobium (Nb) or a combination thereof is in a range from about 0.005% to about 0.8%. Alternately, the total content of niobium, titanium, or a combination thereof is in a range from about 0.008% to about 0.6% by weight. In addition, if present, titanium (Ti) is present with nitrogen (N) and sulfur (S) satisfying a relationship Ti* greater than or equal to about 0.01% and less than or equal to about 0.6%, where Ti* equals (Ti−(24/7)N−(3/2)S), where Ti* is the effective titanium content.

Although no vanadium may be present, the addition of a small amount of vanadium may be used for retarding austenite recrystallization and refining ferrite grains, increasing the strength of the steel. However, when the total content of this element exceeds about 0.12% by weight, excess vanadium carbides and vanadium nitrides are precipitated out in the steel. Since these types of precipitates are usually formed on grain boundaries, excess vanadium carbides and vanadium nitrides can reduce castability during producing the steel sheet, and also deteriorate the formability of the steel sheet when forming or press forming the manufactured steel sheet into the final automotive parts. Moreover, the impact toughness, fracture performance, crashworthiness, stretch formability, stretch flangeability and fatigue property of the steel sheet could also be reduced due to the occurrence of excess vanadium carbides and vanadium nitrides. The content of vanadium is less than about 0.12%. Alternately, the amount of vanadium is less than about 0.1% by weight.

Incidental ingredients and other impurities should be kept to as small a concentration as is practicable. Incidental ingredients are typically the ingredients arising from use of scrap metals and other additions in steel making, as occurs in preparation of molten composition in a steel making furnace.

By employing a steel starting material falling within the above composition, the manufacturing process to make steel sheet may have less demanding facility requirements and less restrictive processing controls. Further, the process may be carried out at existing mills without any additional equipment or added capital cost.

An alternate process for producing the complex phase steel in accordance with the present disclosure includes the following steps:

i. Assembling a continuous metal slab caster having a casting mold, such as but not limited to a compact strip production facility.

ii. Introducing molten steel having a composition having elements within the ranges discussed above into the casting mold and continuously casting the molten steel into a slab.

iii. For a thick slab, such as a thickness greater than about 100 mm, reheating in a reheating furnace to a temperature in the range between about 1000° C. (1832° F.) and about 1350° C. (2462° F.), and alternately in a range between about 1050° C. (about 1922° F.) and about 1300° C. (about 2372° F.); and holding the thick steel slab in the specified temperature range for a time period of at least about 10 minutes, and alternately at least about 30 minutes, in order to assure the uniformity of the initial microstructure of the thick slab before conducting the hot rolling process. As discussed above, for a thin slab, such as a thickness from about 25 mm to about 100 mm, the reheating process may be eliminated.

iv. Hot rolling the steel slab into a hot band, or a hot rolled sheet, and completing the hot rolling process at a finishing exit temperature, or hot rolling termination temperature, in a range between about $(A_{r3}-60)°$ C. and about 1000° C. (about 1832° F.), and alternately in a range between about $(A_{r3}-30)°$ C. and about 980° C. (about 1796° F.).

v. Cooling the hot rolled steel after completing hot rolling at a mean cooling rate at least about 3° C./s (about 5.4° F./s), and alternately at least about 5° C./s (about 9° F./s).

vi. Coiling the hot rolled steel by a conventional coiler when the hot band has cooled to a temperature not higher than about 800° C. (about 1472° F.). Coiling may be effected at any temperature below about 800° C. (about 1472° F.) down to the ambient temperature. Alternately, the coiling step may be performed at a temperature between about 425° C. (about 797° F.) and about 750° C. (about 1382° F.).

vii. Optionally, pickling the hot rolled coil, to improve the surface quality.

viii. Cold rolling the hot rolled and optionally pickled coil to a desired steel sheet thickness at a desired time. A conventional cold rolling stand or cold rolling mill may be used, with the cold rolling draft or reduction being at least about 25%, and alternately at least about 35%.

ix. Heating the steel sheet to a temperature higher than about 625° C. (about 1157° F.), alternately in the range between about 650° C. (about 1202° F.) and about 925° C. (about 1697° F.), and yet in another alternate about 675° C. (about 1247° F.) to about 900° C. (about 1652° F.), and then holding the sheet at the temperature for between about 10 seconds and 10 minutes. The heating and holding steps may be accomplished by passing the sheet through a conventional hot dip coating line (also known as a continuous steel sheet galvanizing line), which may have the sheet feeding facility 48, heating zone 58, soaking or annealing zone 60, cooling zone 62, and hot dip or galvanizing bath 64 as shown in FIG. 3. On the hot dip coating line, the heating and holding steps may be accomplished in the heating zone 58 and soaking or annealing zone 60. Alternately, the heating step may be done on a continuous annealing line or other processing line.

x. Cooling the steel sheet, which may be accomplished by moving the steel sheet through the cooling zone in the continuous galvanizing line. The composition of the steel sheet maintains stabilized material properties regardless of variations in cooling pattern and rate, and therefore, a particular range for the cooling rate in this step is not required, but may be greater than 5° C./sec.

xi. Discontinue cooling the steel sheet when the temperature of the sheet is reduced to a temperature close to the temperature in the galvanizing bath, the latter of which is usually set up in a range between about 400° C. (about 752° F.) and about 550° C. (about 1022° F.), alternately in a range between about 425° C. (about 797° F.) and about 525° C. (about 977° F.).

xii. Passing the steel sheet through the galvanizing bath (zinc pot or zinc alloy pot) to coat the surface of the steel sheet with a coating, usually a zinc coating or a zinc alloy coating, to improve the corrosion resistance of the steel sheet. The residence time in the galvanizing bath is typically in the range of about 1 second to about 10 seconds, but may vary somewhat depending on the facility and the coating weight specified by the customer. The sheet may then be cooled; no particular cooling rate is required.

xiii. Optionally, annealing the hot dip coating as an alloying treatment after the steel sheet is dipped into and removed from the galvanizing bath. This subsequent alloying process, or galvannealing, may be carried out in a conventional way, such as by reheating the steel sheet to a temperature in a range from 450° C. (842° F.) to 650° C. (1202° F.), and may be from about 475° C. (about 887° F.) to about 625° C. (about 1157° F.).

xiv. Optionally, further cooling the steel after the alloying process of galvannealing as in step (xiii). A particular cooling rate during this process is not required, and may be, for instance, 5° C./s or more.

xv. After hot dip coating, such as but not limited to galvanizing, and optionally, both galvanizing and galvannealing, then one or more of the following processes may be performed: tension leveling, skin passing, or temper rolling to improve the surface shape and/or to impart the desired surface texture of the coated steel sheets. The amount of extension or elongation used during tension leveling, skin passing, or temper rolling may be selected in a range, for instance, from about 0% to about 3%, or greater according to the thickness, width and shape of the coated steel sheets, and the capability of the production facility.

xvi. As desired, the present complex phase steel sheet may be formed or press formed into a desired end shape for a final application.

In the foregoing process, the hot-rolled steel sheet may be directly subjected to hot dip coating (such as hot dip galvanizing and, optionally, both galvanizing and galvannealing) under similar conditions in a continuous hot dip galvanizing line as described above in steps (xii) through (xiv). For hot dip coated hot-rolled steel, the above described step (viii) cold rolling could be eliminated.

In the course of developing the multi-phase steel, several types of low carbon molten steels were made using an Electric Arc Furnace and were then formed into thin steel slabs with thickness ranging from about 50 millimeters to 80 millimeters at the Nucor-Berkeley Compact Strip Production Plant, located in Huger, S.C.

The concentrations of the major chemical elements of several steels are presented in TABLE 1 below. These steels were manufactured according to the present methods, and the chemical elements of these steels, including those elements not shown in TABLE 1, were limited to the ranges specified by the present disclosure.

TABLE 1

(STEEL COMPOSITION)

| Element (%) | Steel A | Steel B | Steel C | Steel D | Steel E | Steel F |
|---|---|---|---|---|---|---|
| C (%) | 0.0620 | 0.0577 | 0.0600 | 0.0510 | 0.0510 | 0.0560 |
| Mn (%) | 1.489 | 1.521 | 1.529 | 1.547 | 1.536 | 1.505 |
| Si (%) | 0.462 | 0.481 | 0.459 | 0.590 | 0.517 | 0.549 |
| Al (%) | 0.0430 | 0.0520 | 0.0510 | 0.0634 | 0.0300 | 0.0390 |
| Mo + Cr + Ni (%) | 0.162 | 0.169 | 0.175 | 0.208 | 0.185 | 0.221 |
| Ti + Nb (%) | 0.096 | 0.110 | 0.085 | 0.103 | 0.103 | 0.103 |
| Ti* (%) | 0.037 | 0.055 | 0.027 | 0.035 | 0.042 | 0.045 |

Each of the steel slabs was hot rolled to form respective hot bands using hot rolling termination temperatures or finishing exit temperatures ranging from $(A_{r3}-20)$° C. to 930° C. (1706° F.). Immediately after completing hot rolling, the hot rolled steel sheets were water cooled at a conventional run-out table using cooling rates faster than 10° C./s (18° F./s) down to the coiling temperatures ranging from 500° C. (932° F.) to 650° C. (1202° F.), and then were coiled at the corresponding temperatures.

After hot rolling and coiling, the hot bands were pickled to improve surface quality and then cold rolled to obtain a final thickness of the cold rolled steel sheet of 1.5 mm. The cold rolling step was performed at a conventional reversing cold mill using total cold reduction in a range between 40% and 75%.

Then, the cold rolled steel sheets were hot dip galvanized at a continuous hot dip galvanizing line. Prior to dip coating, the cold rolled steel sheet was heated to a soaking temperature between about 700° C. (1292° F.) and 875° C. (1607° F.), with a soaking time between about 20 seconds and 3 minutes. Alternately, the soaking time may be between about 10 seconds and 10 minutes. The line speeds ranged from 50 meters/minute to 100 meters/minute. The temperature in the galvanizing bath (also known as a zinc alloy pot) was set in a range between 450° C. (842° F.) and 480° C. (896° F.).

Subsequently, the coated steel sheets were tension leveled and skin passed, using a total elongation or extension of not more than 1%. Good surface appearance and shape quality were observed on all of the resulting hot dip coated steel manufactured according to the present methods.

Full thickness test pieces were taken from the hot dip coated steel sheets along the longitudinal (L), diagonal (D) and transverse (T) directions, and then the test pieces were machined into ASTM tensile specimens. The tensile testing was conducted in accordance with the standard ASTM A370 method on the specimens using an Instron 5567 Table Mounted Testing System with a capacity of 30 kN (6750 lb), equipped with Merlin Software.

Mechanical properties of the final thickness specimens, including the yield strength, the tensile strength and the total elongation were measured during the tensile testing. More specifically, the yield strength was determined on the specimens at an offset strain of 0.2%.

The results of the material property measurements for the present multi-phase steel sheet specimens with a final thickness of 1.5 mm are presented below in TABLE 2.

TABLE 2

(MULTI-PHASE STEEL PROPERTIES)

| Material Properties | Testing Direction | Present Multi-Phase Steel Sample (1.5 mm) | | | | | |
|---|---|---|---|---|---|---|---|
| | | A | B | C | D | E | F |
| Tensile Strength (MPa) | L | 863 | 848 | 848 | 816 | 860 | 857 |
| | D | 866 | 823 | 832 | 834 | 807 | 833 |
| | T | 866 | 896 | 926 | 852 | 905 | 919 |
| Yield Strength (MPa) | L | 728 | 745 | 691 | 699 | 717 | 706 |
| | D | 739 | 734 | 682 | 751 | 718 | 755 |
| | T | 740 | 825 | 771 | 754 | 792 | 823 |
| Yield Ratio (%) | L | 84.4 | 87.9 | 81.5 | 85.7 | 83.4 | 82.4 |
| | D | 85.3 | 89.2 | 82.0 | 90.0 | 89.0 | 90.6 |
| | T | 85.5 | 92.1 | 83.3 | 88.5 | 87.5 | 89.6 |
| Total Elongation (%) | L | 16 | 13 | 14 | 15 | 13 | 14 |
| | D | 15 | 14 | 15 | 14 | 14 | 13 |
| | T | 15 | 12 | 12 | 13 | 12 | 16 |

Additionally, since the filing of U.S. Provisional Patent Application No. 60/978,997, production of the presently disclosed steel provided statistical data for average Tensile Strength, Yield Strength, and Elongation properties for the production steel.

TABLE 2A (MULTI-PHASE STEEL PROPERTIES)

| PRODUCTION PERIOD | Tensile Strength (MPa) | | Yield Strength (MPa) | | Elongation (%) | |
|---|---|---|---|---|---|---|
| | Average | Std. Dev | Average | Std. Dev | Average | Std Dev. |
| January-March, 2008 | 892 | 36 | 758 | 41 | 12.2 | 1.5 |
| April-June, 2008 | 882 | 40 | 758 | 46 | 12.7 | 1.4 |
| July, 2008 | 886 | 39 | 760 | 42 | 12.9 | 1.2 |
| August, 2008 | 874 | 32 | 736 | 26 | 12.4 | 1.1 |

In order to compare the material properties between the present multi-phase steel and the conventional hot dip coated dual phase steel, two commercially available hot dip galvanized dual phase steel sheets with a final thickness of 1.5 mm and a similar tensile strength level were obtained as comparative samples and subsequently tested in the same way as described above. The results of the material property measurements for these comparative steel sheet specimens are presented below in TABLE 3.

TABLE 3

(PRIOR ART STEEL PROPERTIES)

| Material Properties | Testing Direction | Prior Art Dual Phase Steel Sample (1.5 mm) | |
|---|---|---|---|
| | | X | Y |
| Tensile Strength (MPa) | L | 864 | 785 |
| | D | 851 | 822 |
| | T | 843 | 859 |
| Yield Strength (MPa) | L | 525 | 523 |
| | D | 524 | 531 |
| | T | 512 | 547 |
| Yield Ratio (%) | L | 60.1 | 66.6 |
| | D | 61.6 | 64.6 |
| | T | 60.7 | 63.7 |
| Total Elongation (%) | L | 14 | 17 |
| | D | 16 | 16 |
| | T | 16 | 14 |

The material property data shown in TABLE 2, TABLE 2A, and TABLE 3 illustrate that the present hot dip coated complex metallographic structured or multi-phase structured steel as well as the commercial hot dip coated dual phase steel exhibit high tensile strength as well as high elongation, indicating that both types of steel have a good combination of strength and formability.

As also seen from the data presented in TABLE 2 and TABLE 3, on the other hand, steels A, B, C, D, E and F, which were manufactured according to the disclosed method exhibit significantly higher yield strength than that for steels X and Y, the commercial hot dip galvanized dual phase steel, even though steels X and Y exhibit a similar tensile strength level. The yield strength measured on the multi-phase structured steel samples in TABLE 2 is higher than 680 megapascals, while the yield strength of the commercial dual phase steel samples in TABLE 3 is lower than 550 megapascals. We have found that the yield strength of the presently disclosed multi-phase steel is greater than 600 megapascals, while the yield strength of comparative commercial dual phase steel is lower than 600 megapascals.

The yield strength is one parameter characterizing the dent resistance, durability and crashworthiness of steel. Higher yield strength improves dent resistance, durability and crashworthiness of the steel sheet. Accordingly, the hot dip galvanized complex metallographic structured or multi-phase structured steel manufactured according to the presently disclosed method possess better dent resistance, better durability, better intrusion resistance and better crashworthiness, compared to the commercial dual phase steel with a similar tensile strength. For this reason, the present multi-phase steel may enable certain sheet metal parts to be thinner than they would be using prior art steel, reducing part weight and improving efficiency.

Similar observations on the yield/tensile ratio, or the yield ratio, may be made in TABLE 2 and TABLE 3, where the presently hot dip galvanized complex metallographic structured or multi-phase structured steel exhibits markedly higher yield ratios than those associated with the commercial hot dip galvanized dual phase steel. For example, the yield ratio of the present multi-phase steel is higher than 70%. Alternately, the yield ratio is higher than 80%. The yield ratio in prior art commercial hot dip galvanized dual phase steel is normally lower than 70%. This property comparison further demonstrates that the dent resistance, durability, intrusion resistance and crashworthiness of the present multi-phase hot dip coated steel were much better than those associated with the commercial hot dip coated dual phase steel with a similar tensile strength.

Additionally to demonstrate the excellent formability, excellent stretch formability, excellent stretch flangeability as well as excellent fracture performance of the present multi-phase steel, samples of the present hot dip galvanized complex metallographic structured or multi-phase structured steel and samples of commercially available hot dip galvanized dual phase steel with a similar tensile strength were stamped into various parts in a stamping plant. The complex metallographic structured or multi-phase structured steel manufactured in accordance with the present method were successfully formed into the desired parts without any difficulty, whereas the commercial dual phase steel encountered various forming problems during the stamping process to make the same kinds of parts. Neither apparent shear fractures nor edge fractures were observed with the present multi-phase steel during the stamping or forming processes, while these fractures did occur when commercial dual phase steel was used.

The stamping or forming processes included a process of stretching a part over a radius and a process of stretching an edge of the part.

Compared to the commercial dual phase steels, the present multi-phase steel has excellent impact performance and crashworthiness. The multi-phase steel has an impact energy greater than about 1200 gram-meters, and may be greater than about 1300 gram-meters. Each impact energy measurement was taken on a V-notch Charpy specimen of about 1.5 mm thickness.

In order to evaluate the impact toughness and crash resistance of the hot dip coated complex metallographic structured or multi-phase structured steel versus comparison commercially available hot dip galvanized dual phase steel, a number of V-notch Charpy specimens were machined and prepared according to ASTM E23-05, from as-coated steel sheets having a thickness of 1.5 millimeters. These specimens were then tested for the material property of the mean impact energy at ambient temperature using a S1-1 K3 Pendulum Impact Machine. During testing, a 407 J (300 foot-pound) Charpy pendulum with a length of 800 millimeter was used at an impact velocity of 5.18 meters/second (17 feet/second). The material property of the various mean impact energies determined for steels A, E, X and Y are presented below in TABLE 4.

TABLE 4

(IMPACT TOUGHNESS COMPARISON)

| Material Property | A (Present Multi-phase steel) | E (Present Multi-phase steel) | X (Prior Art Example) | Y (Prior Art Example) |
|---|---|---|---|---|
| Mean Impact Energy (g-m) | 1521 | 1383 | 968 | 1106 |

As indicated in TABLE 4, the impact energy for the multi-phase steels A and E was notably higher than the impact energy for comparative commercial steels X and Y. These results illustrate that the present hot dip coated complex metallographic structured or multi-phase structured steel possesses much better impact performance and crash resistance than conventional hot dip coated dual phase steel produced by prior art methods.

In order to evaluate weldability, resistance spot welding testing was conducted on one of the present hot dip galvanized complex metallographic structured or multi-phase structured steel sheet with a 1.5 mm thickness and that was not galvannealed. The same testing procedure was also performed on a commercially available hot dip galvanized dual phase steel sheet with the same thickness of 1.5 mm. A GE Schmidt 150 kVA pedestal resistance spot welder and GM Size #2 MWZ-6006 dome nose electrodes were used for the resistance spot welding testing. The employed weld control was a Miyachi STA100 control. Constant current mode was used to control the welding current during the testing. A digital force gauge manufactured by Senor Development Inc. was used to measure the electrode force. The weldability procedure included a hold time sensitivity test, weld lobe generation, and a chisel test. The welding parameters employed for the testing are summarized in TABLE 5.

TABLE 5

(RESISTANCE SPOT WELDING PARAMETERS)

| Electrodes | Electrode Force (kN) | Electrode Force (lbs) | Squeeze Time (cycles) | Weld Time-Cool Time Schedule Level | Weld Time-Cool Time Weld-Cool (cycles) | Weld Time-Cool Time Total Weld (cycles) | Hold Time (cycles) |
|---|---|---|---|---|---|---|---|
| GM Size #2 MWZ 6006 | 4.23 | 950 | 60 | L2 | 5-1-5-1-5-5 | 15 | 5 |
|  |  |  |  | L1 | 6-1-6-1-6-5 | 18 |  |
|  |  |  |  | Nominal | 7-1-7-1-7-5 | 21 |  |
|  |  |  |  | H1 | 8-1-8-1-8-5 | 24 |  |
|  |  |  |  | H2 | 9-1-9-1-9-5 | 27 |  |

The welding test process was divided into squeeze, weld, and hold times. The time is expressed in cycles of 60 Hz frequency (60 cycles is 1 second). Squeeze time is the time between the initial application of the electrode pressure on the work, and the first application of current in making the spot weld. As indicated in TABLE 5, the squeeze time tested was 60 cycles. Weld time is the interval during which the welding current flows through the electrodes. The weld schedule tested included three pulses of weld times and cool times shown in TABLE 5 to reach a total weld time. Following the weld schedule, the electrode force was maintained for a hold time.

A hold time sensitivity test was performed to determine whether any interfacial separation exists due to rapid quenching. After electrode conditioning was completed, the like test pieces of steel sheet were welded and peel tested at each 100 A current increment to determine the current that produced a suitable button size for the weld time. The peel test consists of spot welding two sheet samples together, and then peeling the welded samples apart, typically causing one of the welded sheet samples to shear or tear around the spot weld leaving a weld "button" on the opposite sheet sample. The button size (weld nugget) was determined using the four times square root of thickness rule. Further, peeled welds were cross-sectioned to examine any interfacial separation and evaluate the profile and soundness of the weld nugget.

Figure 6:
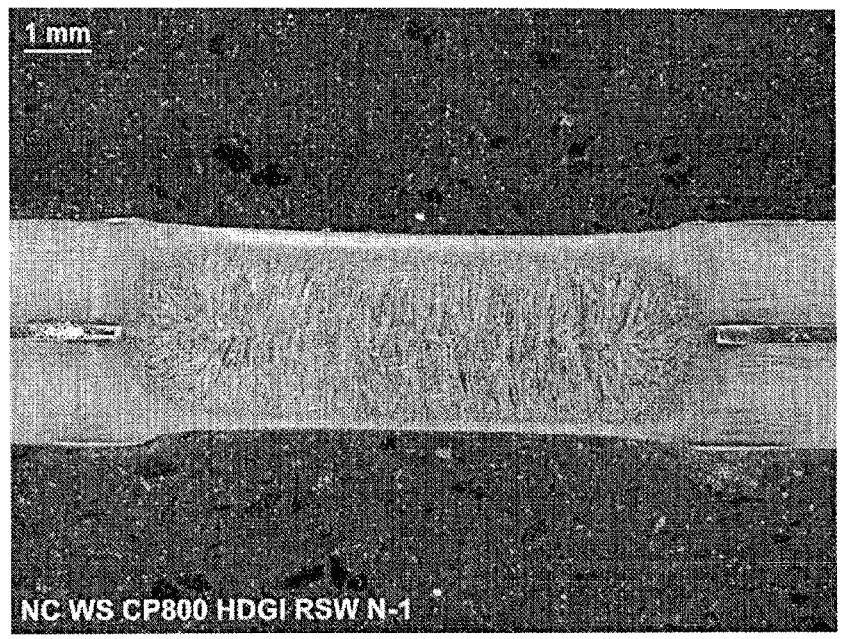
FIG. 6 is a micrograph showing a weld profile obtained from resistance spot welds of an embodiment of the presently disclosed complex metallographic structure or multi-phase structure steel.

Of the welded samples taken from the presently claimed hot dip galvanized, high strength, complex metallographic structured or multi-phase structured steel, the weld nuggets were observed to have de minimus or no shrinkage voids or micro cracks within the welding time and current range employed during testing. The examination on these welded samples revealed neither interfacial separation nor a change of nugget size at longer hold time. FIG. 6 shows a weld profile obtained from resistance spot welds in the present multi-phase steel. FIG. 6 demonstrates that no weld defect exists on the weld.

On several weld nuggets of the spot welded samples taken from prior commercial hot dip galvanized dual phase steel sheet, however, shrinkage voids and micro cracks as well as interfacial fracture or partial interfacial fracture were observed.

Subsequently, a spot weld lobe graph was generated. The spot weld lobe graph shows the current range, or lobe width, which is the range of welding current used to form a spot weld before weld expulsion occurs. Thus, the lobe width is the operating range to make the desired weld before causing expulsion. A wider lobe width provides a greater operating range for welding.

Figure 7:
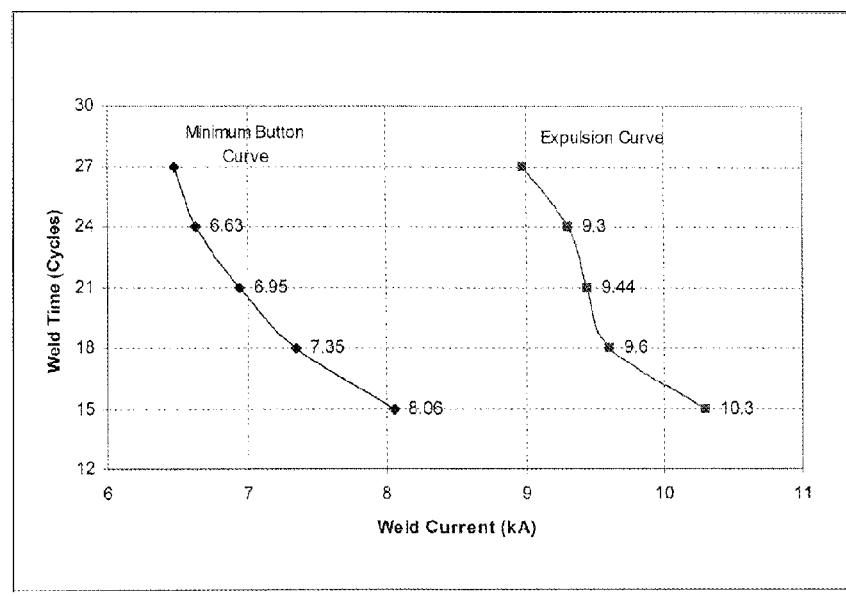
FIG. 7 is a diagram showing a weld lobe chart for an embodiment of the presently disclosed complex metallographic structure or multi-phase structure steel.

The expulsion curve was established by increasing weld current in 200 ampere increments until a flashing condition was observed in welding the test pieces. The minimum button diameter curve was developed by establishing about the lowest weld current to produce three consecutive specimens with a minimum button size at each of the weld times. The spot weld lobe curve was then established by plotting the minimum button diameter curve and the expulsion curve at the three or more weld times. The spot weld lobe curve of FIG. 7 was determined using five weld times, i.e. 3 pulses at 15 cycles, 3 pulses at 18 cycles, 3 pulses at 21 cycles, 3 pulses at 24 cycles, and 3 pulses at 27 cycles. The weld lobe generated in this way for the hot dip galvanized complex metallographic structured or multi-phase structured steel is shown in FIG. 7, which confirms a wide weld current range at the weld times.

In order to further compare the weldability, the weld current range measured in the way described above at desired weld times are presented below in TABLE 6 for the present multi-phase steel and that of commercially available comparative steel.

TABLE 6

(WELD LOBE COMPARISON)

| Weld Time (Cycles) | Current Range (kA) | |
| --- | --- | --- |
| | Present Multi-phase Steel A | Comparative Steel X |
| 27 | 2.49 | 1.60 |
| 24 | 2.67 | 1.69 |
| 21 | 2.49 | 1.64 |
| 18 | 2.25 | 1.60 |
| 15 | 2.24 | 1.60 |

The testing results in TABLE 6 demonstrate much wider current ranges measured on the presently invented hot dip galvanized steel sheet. The current range for each measured weld time on the present multi-phase steel sheet is wider than 2 kA, and may be wider than 2.2 kA. On the other hand, as also can be seen from the testing data in TABLE 6, the current ranges measured on the commercially available hot dip galvanized dual phase steel, having a similar tensile strength and produced using the prior art methods, are significantly narrower. The values of the relevant current range are lower than 2 kA, and may be lower than 1.7 kA.

The presently claimed multi-phase phase steel has a wider current range measured at different weld times, enabling greater operating windows and thus being more weldable than past hot dip coated dual phase steels of a similar tensile strength.

Finally, chisel test specimens were produced by spot welding two sheet samples together. The chisel test consists of forcing a tapered chisel into the gap between the two sheet samples on each side of the weld being tested until the weld or base metal fails. The edges of the chisel do not touch the weld being tested. In our testing, none of the chisel samples prepared from the present multi-phase steel were separated in the chisel test, and the base steel was deformed around the welds of the hot dip galvanized complex metallographic structured or multi-phase structured steel. By contrast, several chisel samples were separated from the welds of the commercially available hot dip galvanized dual phase steel.

Weldability is one parameter used to determine whether a steel may be used in certain applications in the automotive and other industries. Accordingly, the examples set out above illustrate that the compositions and microstructure of steel developed according to the present methods lead to improved weldability, exceeding the weldability of the prior art methods for commercially producing hot dip coated advanced high strength steel.

As is also well known in the automotive industry, one of the greatest challenges faced with using the advanced high strength steels is achieving good weldability. Accordingly, the examples set out above illustrate that the compositions and microstructure of the presently disclosed steel provides better weldability than the prior commercially produced hot dip coated advanced high strength steels.

Compared to the commercially available dual phase steels, the presently claimed complex metallographic structured steel has excellent stretch flangeability, stretch formability and/or edge-stretching performance, as evidenced by the presently disclosed steel sheets having a hole expansion ratio $\lambda$ greater than about 50%, and may be greater than about 60%.

To compare the stretch flangeability, edge-stretching performance, and stretch formability of the present multi-phase steel with comparison commercial hot dip galvanized dual phase steel, a number of square test specimens of about 100 millimeter by 100 millimeter were cut from steel sheets of 1.5 millimeter thickness and then prepared for hole expansion testing according to JFS T1001 standard. The hole expansion ratio measurements are shown in TABLE 7.

TABLE 7

(HOLE EXPANSION RATIO COMPARISON)

| Material Property | A (Present Multi-phase Steel) | C (Present Multi-phase Steel) | X (Comparative Dual Phase Steel) | Y (Comparative Dual Phase Steel) |
| --- | --- | --- | --- | --- |
| Hole Expansion Ratio $\lambda$ (%) | 65.2 | 61.3 | 16.2 | 17.9 |

As shown in TABLE 7, the value of hole expansion ratio $\lambda$ measured on the present multi-phase steel is greater than 50%, and may be greater than about 60%. By contrast, this value is lower than 20% for the conventional dual phase steel sheets produced using the prior methods. The above hole expansion testing results further demonstrate the excellent stretch flangeability, edge-stretching performance and stretch formability of the present complex metallographic structured or multi-phase structured steel.

Although the present invention has been shown and described in detail with regard to only a few exemplary embodiments of the invention, it should be understood by those skilled in the art that it is not intended to limit the invention to specific embodiments disclosed. Various modifications, omissions, and additions may be made to the disclosed embodiments without materially departing from the novel teachings and advantages of the invention, particularly in light of the foregoing teachings. Accordingly, it is intended to cover all such modifications, omissions, additions, and equivalents as may be included within the spirit and scope of the invention as defined by the following claims.

What is claimed is:

1. A complex metallographic structured cold rolled steel comprising:
   (a) a composition comprising the following elements by weight:
   carbon in a range from greater than 0.05% to about 0.2%,
   manganese in a range from about 0.2% to about 3.5%,
   phosphorous less than or equal to about 0.1%,
   sulfur less than or equal to about 0.03%,
   silicon less than or equal to about 1.2%,
   aluminum in a range from about 0.01% to about 0.10%,
   nitrogen less than or equal to about 0.02%,
   copper less than or equal to about 0.8%,
   vanadium less than or equal to about 0.12%,
   one chosen from molybdenum, chromium, nickel, and a combination thereof, in a range between about 0.05% and about 3.5%, and
   one chosen from titanium, niobium and a combination thereof, in a range between about 0.005% and about 0.8%, wherein, if present, titanium (Ti) is present with nitrogen (N) and sulfur (S) satisfying a relationship Ti* greater than or equal to about 0.01% and less than or equal to about 0.6%, where Ti* equals (Ti-(24/7)N-(3/2)S),
   and the balance of the composition comprising iron and incidental ingredients;
   (b) a multi-phase microstructure having in combination ferrite, martensite between about 3% and about 65% by volume, and at least one microstructure selected from the group consisting of bainite and retained austenite, and having fine precipitates selected from the group of TiC, NbC, TiN, NbN, (Ti.Nb)C, (Ti.Nb)N and (Ti.Nb)(C.N) particles having at least 50% smaller than 20 nm in size, and
   (c) physical properties comprising tensile strength greater than about 780 megapascals and at least one of the following properties of elongation greater than about 10%, yield ratio greater than about 70%, and hole expansion ratio greater than about 50%.

2. The complex metallographic structured cold rolled steel of claim 1, wherein the martensite phase of the microstructure comprises between about 10% and about 35% by volume of the microstructure.

3. The complex metallographic structured steel sheet of claim 1, wherein the bainite phase of the microstructure comprises between about 2% and about 20% by volume of the microstructure.

4. The complex metallographic structured cold rolled steel of claim 1, wherein the bainite phase of the microstructure comprises between about 5% and about 15% by volume of the microstructure.

5. The complex metallographic structured cold rolled steel of claim 1, wherein the retained austenite phase of the microstructure comprises between about 1% and about 12% by volume of the microstructure.

6. The complex metallographic structured cold rolled steel of claim 1, wherein the retained austenite phase of the microstructure comprises between about 3% and about 8% by volume of the microstructure.

7. The complex metallographic structured cold rolled steel of claim 1, wherein the ferrite in the microstructure comprises between about 20% and 85% by volume of the microstructure.

8. The complex metallographic structured steel sheet of claim 1, further comprising a hot-dipped coating chosen from zinc, aluminum, or an alloy thereof.

9. The complex metallographic structured cold rolled steel of claim 1, the composition further comprising a purposeful addition of calcium less than or equal to about 0.02%.

10. The complex metallographic structured cold rolled steel of claim 9, the composition comprising the following elements by weight:
    carbon in a range from about 0.05% to about 0.18%,
    manganese in a range from about 0.5% to about 3.0%,
    phosphorous less than or equal to about 0.06%,
    sulfur less than or equal to about 0.01%,
    silicon less than or equal to about 1.0%,
    aluminum in a range from about 0.015% to about 0.08%,
    calcium less than or equal to about 0.01%,
    nitrogen less than or equal to about 0.012%,
    copper less than or equal to about 0.6%,
    vanadium less than or equal to about 0.1%,
    one chosen from molybdenum, chromium, nickel, and a combination thereof, in a range between about 0.08% and about 3.0%, and
    one chosen from titanium, niobium and a combination thereof, in a range between about 0.008% and about 0.6%, wherein, if present, titanium (Ti) nitrogen (N) and sulfur (S) satisfying a relationship Ti* greater than or equal to about 0.01% and less than or equal to about 0.6%, where Ti* equals (Ti-(24/7)N-(3/2)S),
    and the balance of the composition comprising iron and incidental ingredients.

11. The complex metallographic structured cold rolled steel of claim 1, the properties comprising yield strength at least about 650 megapascals.

12. The complex metallographic structured cold rolled steel of claim 1, the properties comprising impact strength greater than about 1200 gram-meters measured on a Charpy V-notch specimen 1.5 millimeters thick.

13. The complex metallographic structured cold rolled steel of claim 1, the properties comprising weldability characteristic defined by a weld current range greater than 2 kiloamperes measured for a weld time greater than 15 cycles in a 1.5 millimeter thick sheet that is galvanized and not galvannealed.

* * * * *